United States Patent
Taylor et al.

(10) Patent No.: US 11,810,414 B2
(45) Date of Patent: Nov. 7, 2023

(54) SYSTEMS AND METHODS FOR DETERMINING AND EXECUTING TRUSTED USER ACCESS

(71) Applicant: Walmart Apollo, LLC, Bentonville, AR (US)

(72) Inventors: Robert J. Taylor, Rogers, AR (US); Jeffrey D. Franklin, Rogers, AR (US); Melissa M. Wacha, Bentonville, AR (US); Mark McCrary, Cave Springs, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/869,442

(22) Filed: Jul. 20, 2022

(65) Prior Publication Data
US 2022/0358803 A1    Nov. 10, 2022

Related U.S. Application Data

(63) Continuation of application No. 17/131,363, filed on Dec. 22, 2020, now abandoned, which is a
(Continued)

(51) Int. Cl.
*G07C 9/25*    (2020.01)
*G07C 9/00*    (2020.01)
(Continued)

(52) U.S. Cl.
CPC ........... *G07C 9/25* (2020.01); *G06Q 30/0639* (2013.01); *G07C 9/00309* (2013.01);
(Continued)

(58) Field of Classification Search
CPC .. G07C 9/25; G07C 9/00309; G07C 9/00896; G07C 2009/00539; H04W 4/023; H04W 4/35; G06Q 30/0639
See application file for complete search history.

(56) References Cited

U.S. PATENT DOCUMENTS 8,797,138 B2   8/2014 Myers
9,158,946 B2   10/2015 Amdahl
(Continued)

FOREIGN PATENT DOCUMENTS

CN    103366420      12/2016
WO    2020214646 A1  10/2020

OTHER PUBLICATIONS

Optical Lock; "How it Works—OpticalLock Tamper Detecting Container Lock"; https://www.opticallock.com/opticallock-system-no-tamper-locks/how-optical-lock-works/; available as early as Mar. 29, 2019; pp. 1-4.
(Continued)

*Primary Examiner* — James J Yang
(74) *Attorney, Agent, or Firm* — Fitch, Even, Tabin & Flannery LLP

(57) ABSTRACT

Systems, apparatuses, and methods are provided herein for user access to smart locks at a retail shopping facility. In one embodiment, a system for user access to smart locks at a retail shopping facility includes an access member, a smart lock securing the access member, and a control circuit. The control circuit configured to receive authentication data from the user interface device; determine whether the authentication data matches within a threshold of stored authentication data associated with a profile stored in a database; determine that the user is a trusted user based on the determination that the authentication data matches with the stored authentication data within the threshold; and provide an optical key to the user interface device, wherein the smart lock is configured to unlock the access member in response to receiving the optical key from the user interface device.

21 Claims, 11 Drawing Sheets

Related U.S. Application Data continuation of application No. 16/849,149, filed on Apr. 15, 2020, now abandoned.

(60) Provisional application No. 62/834,133, filed on Apr. 15, 2019, provisional application No. 62/834,159, filed on Apr. 15, 2019.

(51) Int. Cl.
*H04W 4/02* (2018.01)
*H04W 4/35* (2018.01)
*G06Q 30/0601* (2023.01)

(52) U.S. Cl.
CPC ........ *G07C 9/00896* (2013.01); *H04W 4/023* (2013.01); *H04W 4/35* (2018.02); *G07C 2009/00539* (2013.01)

(56) References Cited

U.S. PATENT DOCUMENTS

| | | |
|---|---|---|
| 9,430,892 B2 | 8/2016 | Amdahl |
| 9,482,522 B2 | 11/2016 | Motoyama |
| 9,557,719 B2 | 1/2017 | Liu |
| 10,013,829 B2 | 7/2018 | Taylor |
| 10,019,860 B1 | 7/2018 | Kim |
| 2005/0200454 A1 | 9/2005 | Martinez |
| 2012/0036905 A1 | 2/2012 | Grayson |
| 2014/0330603 A1 | 11/2014 | Corder |
| 2016/0155281 A1* | 6/2016 | O'Toole ............... H04W 12/50 340/5.64 |
| 2017/0103647 A1 | 4/2017 | Davis |
| 2018/0010820 A1 | 1/2018 | Hirsch |
| 2018/0060800 A1* | 3/2018 | Robinson .......... G07C 9/00182 |
| 2018/0101820 A1* | 4/2018 | Peynet .............. G07C 9/00912 |
| 2018/0158021 A1 | 6/2018 | Dautz |
| 2018/0233024 A1 | 8/2018 | Fawcett |
| 2018/0286160 A1* | 10/2018 | Taylor .................... E05B 35/00 |
| 2019/0035186 A1 | 1/2019 | Nitu |
| 2019/0047460 A1* | 2/2019 | Goldberg ................. G07F 9/10 |
| 2019/0114585 A1* | 4/2019 | Fee .................. G06Q 10/0836 |
| 2020/0066077 A1* | 2/2020 | Hara ................. G07C 9/00912 |
| 2020/0187694 A1* | 6/2020 | Santangeli ......... G07C 9/00309 |
| 2020/0327760 A1 | 10/2020 | Taylor |
| 2021/0110624 A1 | 4/2021 | Taylor |

OTHER PUBLICATIONS

PCT; App. No. PCT/US2020/028222; International Preliminary Report on Patentability dated Oct. 28, 2021; (7 pages).
PCT; App. No. PCT/US2020/028222; International Search Report and Written Opinion dated Jun. 29, 2020.
Song, Seok-Jeong et al.; "Visible Light Identification System for Smart Door Lock Application with Small Area Outdoor Interface"; Current Optics and Photonics; vol. 1, No. 2; Apr. 2017; pp. 90-94.
USPTO; U.S. Appl. No. 16/849,149; Notice of Allowance dated Sep. 25, 2020; (9 pages).
USPTO; U.S. Appl. No. 17/131,363; Notice of Allowance and Fees Due (PTOL-85) dated Apr. 20, 2022; (8 pages).

* cited by examiner

SYSTEMS AND METHODS FOR DETERMINING AND EXECUTING TRUSTED USER ACCESS

CROSS-REFERENCE TO RELATED APPLICATIONS

This application is a continuation of U.S. application Ser. No. 17/131,363 filed Dec. 22, 2020, which is a continuation of U.S. application Ser. No. 16/849,149 filed Apr. 15, 2020, which claims the benefit of U.S. Provisional Application No. 62/834,159 filed Apr. 15, 2019, and U.S. Provisional Application No. 62/834,133 filed Apr. 15, 2019, all of which are incorporated herein by reference in their entirety.

TECHNICAL FIELD

This invention relates generally to merchandise protection.

BACKGROUND

In a shopping space, items with high risk of theft are sometimes locked within a display shelf or a locked case. Traditionally, these items are locked with conventional metal lock and key. When a customer requests access to an item, a store clerk would locate and retrieve the key to open the case. When a key is lost, the lock often needs to be replaced and/or reconfigured to prevent unauthorized access.

BRIEF DESCRIPTION OF THE DRAWINGS

Disclosed herein are embodiments of systems and methods for determining and executing trusted customer access at a retail shopping facility and/or reporting access to a secured space through an access door secured by a smart lock. This description includes drawings, wherein.

Figure 1:
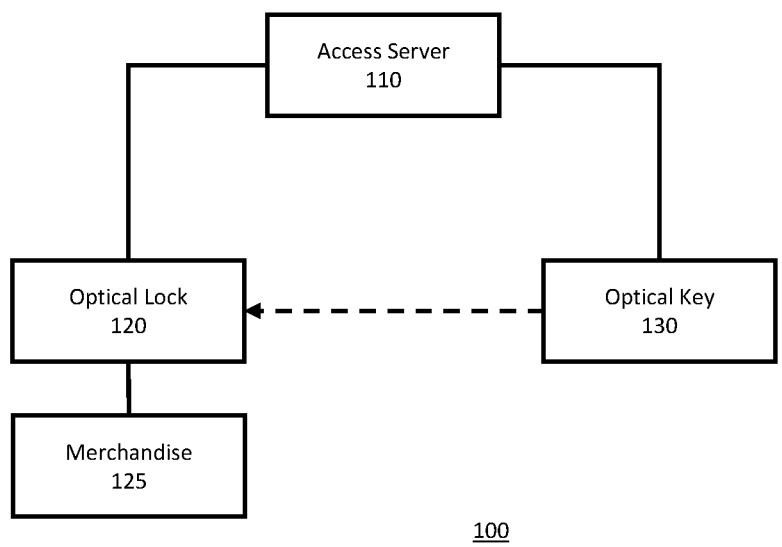
FIG. 1 is a block diagram of a system in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for determining and executing trusted customer access for smart locks at a retail shopping facility. A system for determining and executing trusted customer access for smart locks at a retail shopping facility includes an access door that allows access to a secured space configured to store one or more items for sale at a retail shopping facility. By one approach, the system may include a smart lock securing the access door. In one configuration, the smart lock may detect a user interface device within a threshold distance from the smart lock. Alternatively or in addition to, the smart lock may provide a first signal to the user interface device causing the user interface device to prompt a user to provide an authentication data. In some implementations, the system may include the user interface device operable by the user. By one approach, the user interface device may prompt the user to provide the authentication data in response to a receipt of the first signal from the smart lock. Alternatively or in addition to, the user interface device may receive the authentication data from the user. Alternatively or in addition to, the user interface device may provide the authentication data to a control circuit to determine whether the user is a trusted user. By one approach, the user interface device may receive an optical key from the control circuit in response to the determination by, the control circuit that the user is the trusted user. Alternatively or in addition to, the user interface device may provide the optical key to the smart lock. In one scenario, the smart lock may unlock the access door in response to receiving the optical key.

In some implementations, the control circuit may communicatively couple to the user interface device. For example, the control circuit may receive the authentication data. By one approach, the control circuit may determine whether the authentication data matches within a threshold accuracy a stored authentication data associated with a profile stored in a database. For example, the profile may be associated with the user. Alternatively or in addition to, the control circuit may determine whether a store-risk value associated with the retail shopping facility is within a risk threshold value. In one configuration, the control circuit may determine whether a crime index value associated with an area that is within a threshold distance from the retail shopping facility is within an index threshold value. By one approach, the control circuit may determine that the user is the trusted user based on the determination that the authentication data matches with the stored authentication data within the threshold accuracy, the store-risk value associated with the retail shopping facility is within the risk threshold value, and/or the crime index value associated with the area that is within the threshold distance from the retail shopping facility is within the index threshold value.

In some embodiments, a method for determining and executing trusted customer access for smart locks at a retail shopping facility includes detecting, by a smart lock securing an access door that allows access to a secured space configured to store one or more items for sale at a retail shopping facility, a user interface device within a threshold distance from the smart lock. By one approach, the method may include providing, by the smart lock, a first signal to the user interface device causing the user interface device to prompt a user to provide an authentication data. Alternatively or in addition to, the method may include prompting the user, by the user interface device operable by the user, to provide the authentication data in response to receiving the first signal from the smart lock. In one configuration, the method may include receiving, by the user interface device, the authentication data from the user. By one approach, the method may include providing, by the user interface device, the authentication data to a control circuit to determine whether the user is a trusted user. In some implementations, the method may include receiving, by the user interface device, an optical key in response to determining by the control circuit that the user is the trusted user. Alternatively or in addition to, the method may include providing, by the user interface device, the optical key to the smart lock. By one approach, the method may include unlocking, by the smart lock, the access door in response to receiving the optical key.

In one configuration, the method may include receiving, by the control circuit communicatively coupled to the user interface device, the authentication data. Alternatively or in addition to, the method may include determining, by the control circuit, whether the authentication data matches within a threshold accuracy a stored authentication data associated with a profile stored in a database. In one scenario, the profile may be associated with the user. In one configuration, the method may include determining, by the control circuit, whether a store-risk value associated with the retail shopping facility is within a risk threshold value. Alternatively or in addition to, the method may include determining, by the control circuit, whether a crime index value associated with an area that is within a threshold distance from the retail shopping facility is within an index threshold value. Alternatively or in addition to, the method may include determining, by the control circuit, that the user is the trusted user based on the determination that the authentication data matches with the stored authentication data within the threshold accuracy, the store-risk value associated with the retail shopping facility is within the risk threshold value, and/or the crime index value associated with the area that is within the threshold distance from the retail shopping facility is within the index threshold value. In some implementations, the method may include providing, by the control circuit, the optical key to the user interface device.

In some embodiments, a system for reporting access of a trusted-customer through an access door secured by a smart lock includes an access door that allows access to a secured space configured to store one or more items for sale at a retail shopping facility. In one example, the secure space may include one or more sensors configured to provide sensor data corresponding to the one or more items stored inside the secured space. By one approach, the system may include a smart lock securing the access door. In one configuration, the smart lock may detect a user interface device within a first threshold distance from the smart lock. Alternatively or in addition to, the smart lock may provide a first signal to the user interface device causing the user interface device to prompt a user to provide an authentication data. In one configuration, the smart lock may unlock the access door in response to receiving an optical key from the user interface device. In some implementations, the system may include the user interface device operable by the user. By one approach, the user interface device may receive the optical key from a control circuit. Alternatively or in addition to, the user interface device may provide the optical key to the smart lock to unlock the access door. In some implementations, the system may include the control circuit communicatively coupled to the user interface device and/or the one or more sensors inside the secured space. By one approach, the control circuit may receive the sensor data when a first item of the one or more items is removed from the secured space. In one configuration, the control circuit may determine an item identifier associated with the item based on the sensor data in response to the receipt of the sensor data. Alternatively or in addition to, the control circuit may associate the item identifier with the user based on the authentication data. Alternatively or in addition to, the control circuit may periodically determine location of the user based on wireless coupling of the user interface device with one or more wireless access points distributed throughout the retail shopping facility. In one configuration, the control circuit may determine whether the user has returned the first item to the secured space based on the determined location of the user and a receipt of the sensor data indicating that the item is inside the secured space.

In some embodiments, a method for reporting access of a trusted-customer through an access door secured by a smart lock includes detecting, by a smart lock securing an access door that allows access to a secured space configured to store one or more items for sale at a retail shopping facility, a user interface device within a first threshold distance from the smart lock. In one example, the secure space may include one or more sensors configured to provide sensor data corresponding to the one or more items stored inside the secured space. By one approach, the method may include providing, by the smart lock, a first signal to the user interface device causing the user interface device to prompt a user to provide an authentication data. In some configurations, the method may include unlocking, by the smart lock, the access door in response to receiving an optical key from the user interface device. By one approach, the method may include receiving, by the user interface device, an optical key from a control circuit. Alternatively, or in addition to, the method may include providing, by the user interface device, the optical key to the smart lock to unlock the access door. By one approach, the method may include receiving, by the control circuit communicatively coupled to the user interface device and the one or more sensors inside the secured space, the sensor data when a first item of the one or more items is removed from the secured space. In some implementations, the method may include, in response to receiving the sensor data, determining, by the control circuit, an item identifier associated with the first item based on the sensor data. By one approach, the method may include associating, by the control circuit, the item identifier with the user based on the authentication data. Alternatively, or in addition to, the method may include periodically determining, by the control circuit, location of the user based on wireless coupling of the user interface device with one or more wireless access points distributed throughout the retail shopping facility. In some configurations, the method may include determining, by the control circuit, whether the user has returned the first item to the secured space based on the determined location of the user and a receipt of the sensor data indicating that the first item is inside the secured space.

In some embodiments, an apparatus for securing merchandise comprises a locking mechanism limiting access to one or more items, one or more optical sensors configured to detect a plurality of wavelengths and an intensity associated with each wavelength from at least one light beam emitted by an optical key, and a control device comprising a control circuit and a memory device. The control device being configured to store a lock code comprising a plurality of wavelength values and a plurality of intensity values each associated with a wavelength value on the memory device and determine whether to release the locking mechanism based on whether intensities of each of the plurality of wavelengths detected by the one or more optical sensors match the lock code.

Conventional locked cases in retail stores (sales floor and backroom) as well as in distribution centers suffer from several problems including 1) loss or misplacement of the physical keys that unlock the case, 2) time required to locate the physical key to unlock the case, and 3) lack of knowledge of who is accessing the locked case and/or the key(s). A lock that is activated (locked or unlocked) using a light detector/spectrometer can identify specific wavelengths of visible or non-visible light and/or combinations and ratios of specific wavelengths of visible or non-visible light and/or amount of time a specific wavelength(s) is/are: detected to secure merchandise.

In some embodiments, the laser(s) used in current store handheld scanners may be used to activate a lock with an optical lock tuned to detect that wavelength of the laser (e.g. 650 nanometers, Red). This laser is emitted when a typical barcode scanning action is taken which may be accessed through any screen on the store point of sales system, may be part of a handheld scanner, part of the stores' user interface system, etc. This embodiment would enable any associate to unlock the case much faster with roughly the same security as a physical key.

In some embodiments, additional specific wavelength laser(s) could be included in the scanner and the optical lock tuned to recognize and be activated upon detecting the two or more wavelengths and/or relative intensities of each wavelength and/or length of time each wavelength is detected. The laser output may be activated using a specific tool on a store-owned handheld scanner with associated access permission. A database may track which associate accessed the "Lock/Unlock" tool and when a tool is used to lock/unlock. The device may further be used to scan items in and out of a locked space.

In some embodiments, optical locks may communicate with a central server via a wired and/or wireless network. Security measures may be instituted (similar to an alphanumeric passcode that changes over time that is tied to the user) where a specific user would activate the lock via a specific combination of intensity and/or time that each laser is emitted from the scanner and detected by the lock. A server may log which user accessed which lock and at what time and prevent discrepancies when multiple locks were accessed at the same time.

The disclosed system enables better customer service for items in locked case locations by enabling more associates and/or customers access via a digital tool and still offers loss prevention benefits of locked cases. Once in production, the cost of maintenance of lock/key combinations may be greatly reduced, enabled by the light detection as well as the digital and networked nature of the locks. The system described herein may use combinations of visible or non-visible light to activate locks, which cannot be easily duplicated (as compared to physical key/lock combination) and is not vulnerable to standard password-based technology (which can be guessed, shared, or stolen).

Referring now to FIG. 1, a system for controlling access to merchandise is shown. The system 100 includes an access server 110, an optical key 130, and an optical lock 120 restricting access to merchandise 125. The optical key 130 includes one or more light sources configured to emit light in a plurality of wavelength ranges, each at a specified intensity. In some embodiments, optical key 130 may emit a single light beam with multiple wavelength peaks. In some embodiments, the optical key 130 may emit a plurality of light beams each with a narrow wavelength band from multiple physical light emitting devices such as laser and light emitting diode (LED). In some embodiments, the light sources may emit light inside and outside of the visible spectrum. In some embodiments, the optical key 130 may be implemented with one or more of a portable device (e.g. portable scanner, reader, etc.) used by store or transportation associates, as an attachment to a portable device, as part of a point of sales system (e.g. checkout counter, handheld or flatbed barcode scanner, etc.), and/or as part of a shipping and receiving system (delivery truck, warehouse storage container, etc.). In some embodiments, the light source of the optical key 130 may be configured to adjust one or more of the frequency and the intensity of the emitted light. In some embodiments, the optical key 130 further includes a user interface for user authentication. For example, the optical key 130 may require that a user login to the device and/or the system 100 prior to activating the light sources of the optical key 130 to unlock an optical lock 120. Further details of some embodiments of the optical key are described with reference to FIG. 2 below.

The optical lock 120 includes one or more optical sensors configured to detect a plurality of wavelengths and an intensity associated with each wavelength from at least one light beam emitted by the optical key. The optical sensor(s) may be configured to detect light from a light source at a short distance (e.g. several feet) or in close proximity (e.g. several centimeters or less) of the sensor. In some embodiments, the optical lock 120 may include one or more of a light sensor, a photon sensor, and a spectrometer. The optical lock 120 may be configured to compare the emitted light beam(s) from the optical key with a lock code that specifies multiple of wavelength and intensity combinations to determine whether to release a locking mechanism and provide access to merchandise 125. In some embodiments, the lock code may be updated remotely and/or locally to rekey the optical lock 120. For example, the optical lock 120 may comprise a reset button which, when pressed, stores the detected wavelengths and frequencies combination as a new lock code. The optical lock 120 may be integrated with and/or attached to one or more of a display shelf, a portable casing, a storage container, a transportation container, a secured shopping space, and a secured storage space. Further details of some embodiments of the optical key is described with reference to FIG. 2 below.

The merchandise 125 may be items in the shopping space and/or distribution chain. In some embodiments, the merchandise 125 may be enclosed in a portable casing that may be removed by releasing the locking mechanism of the optical lock 120. In some embodiments, the merchandise 125 may be a group of items locked in a secured area in a shopping space. In some embodiments, the merchandise 125 may be secured within a transportation and/or storage container such as a crate, a cage, etc.

In some embodiments, the system includes an access server 110 that communicates with the optical lock and/or the optical key 130 to provide lock codes for accessing merchandise. The communication between the access server 110 and the optical lock 120 and/or the optical key 130 may be through any wired or wireless communication channel such as BlueTooth, local area network, the Internet, and the like. The access server 110 may be configured to communicate with multiple optical keys and/or optical locks in one or more physical locations and facilities. In some embodiments, the optical lock 120 has a fixed code and the optical key 130 may send a request to the access server 110 to receive the lock code associated with the optical lock 120 to access the locked merchandise. In some embodiments, the optical lock 120 has a rotating code and the optical key 130 may send a request to the access server 110 to receive the lock code for the current time of the day and/or a current day of the week to access the locked merchandise. In some embodiments, when the optical key 130 requests access to the merchandise 125, the access server 110 may transmit a one-time use matching lock code to both the optical key and the optical lock. In some embodiments, optical key 130 may send a request to access merchandise that identifies at least one of the optical lock 120 and the merchandise 125. The unlock request may comprise one or more of an identifier of the user making the request, an authentication code, and an identifier associated with the optical lock device the user wishes to unlock. For example, an unlock request may include one or more of a location of the optical key, an optical lock identifier (lock number, aisle number, section number, etc.), and a merchandise identifier (produce name, product barcode, etc.). In some embodiment, the access server 110 may then retrieve and/or generate a lock code based on the optical lock 120 and/or merchandise 125 identified in the unlock request. In some embodiments, the access server 110 may determine which optical lock to provide the lock code to base on the identifier received from the user of the optical key 130. In some embodiments, the optical lock 120 may be configured to request a lock code from the access server 110 when it detects a light from an optical key.

In some embodiments, the access server 110 further functions to track the use of locks and keys. For example, the access server 110 may maintain a log of access requests and the user and/or optical key associated with each request. The optical key 130 and/or the access server 110 may require a user to enter credentials (username and/or password) prior to submitting an access request and/or activating the optical key 130. In some embodiments, the user credentials used to operate the optical key 130 may be logged by the optical key 130 and/or the access server 110. In some embodiments, the optical key 130 and/or the access server 110 may further prompt the user to enter a number of items to remove or add to the locked space. In some embodiments, the optical lock 120 may communicate with the access server 110 to provide information for each time the optical lock 120 is accessed. The information may contain successful and/or unsuccessful attempts in accessing the merchandise 125. In some embodiments, the optical lock 120 and/or the optical key 130 may further be configured to scan the items in the locked space and provide an item count before and/or after each unlocking event to the access server 110.

While the access server 110 is shown to communicate with both the optical lock 120 and the optical key 130, in some embodiments the access server 110 may be absent from the system or may communicate with only one of the optical lock 120 and the optical key 130. For example, the optical lock 120 may have a rotating lock code based on the time of day and day of the week, month, and/or year etc. The access server 110 may determine which code to provide to the optical key 130 without communicating with the optical lock 120. In some embodiments, each optical key may have a unique fixed lock code. The access server 110 may periodically update the optical lock 120 with a set of currently authorized lock codes and an authorized optical key 130 may access the optical lock 120 without communicating with the access server. In some embodiments, the optical lock 120 may communicate the wavelength peaks and intensities of detected light beam(s) to the access server 110 to determine whether the detected light is emitted by an optical key with a valid lock code.

Figure 2:
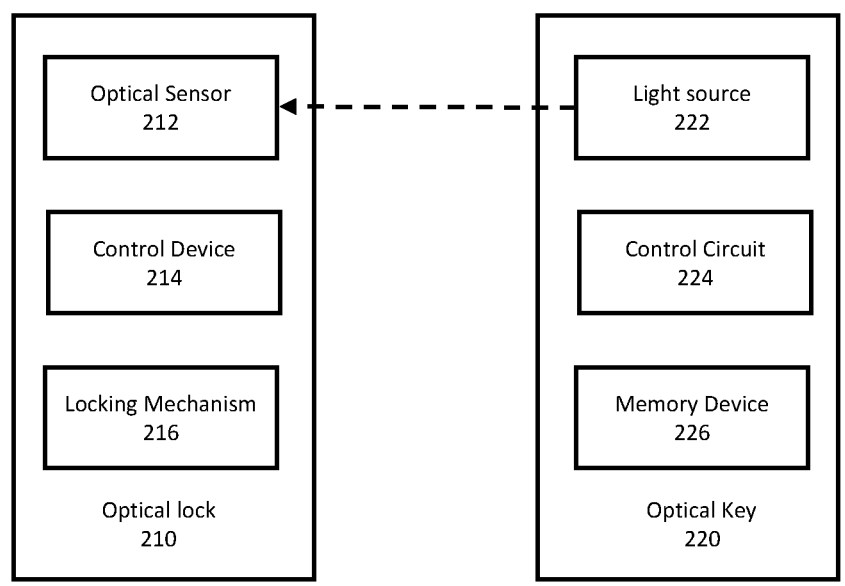
FIG. 2 is a block diagram of an optical lock and an optical key in accordance with several embodiments.

Referring now to FIG. 2, a system for controlling access to merchandise is shown. The system 200 including an optical lock 210 and an optical key 220. The optical lock 210 comprises an optical sensor 212, a control device 214, and a locking mechanism 216.

The optical sensor 212 may comprise one or more optical sensor devices. In some embodiments, the optical sensor 212 may include a spectrometer. In some embodiments, the optical sensor 212 may include a sensor array for sensing the wavelength and/or intensity of multiple light beams. The sensor array may be arranged in a pattern mirroring/matching the pattern of light emitting devices of an optical key such that each sensor is configured to detect and measure light from a corresponding light emitting device. The optical sensor 212 may be configured to simultaneously detect a plurality of wavelengths and an intensity associated with each wavelength from at least one light beam emitted by an optical key. The optical sensor 212 may further be configured to detect modulations of the detected light beam(s) over time.

The control device 214 may include a memory device and a control circuit such as a microprocessor, processor, and hardwired circuit that is configured to receive signals from the optical sensor 212 and control the locking mechanism 216. The control device 214 may be configured to determine whether to release the locking mechanism 216 based on whether intensities of each of the plurality of wavelengths of light beam(s) detected by the one or more optical sensors match a lock code stored in the memory device. The lock code may be stored on a memory device of the control device 214 and/or be retrieved from a server. In some embodiments, the control device 214 may be configured to select a lock code from a plurality of lock codes stored on its memory based on the current time of day and/or the day of the week, month, year, etc. The lock code may specify a plurality of sets of wavelength and intensity combinations. For example, the lock code may specify: 450 nm at 2 W/cm$^2$ 500 nm at 3 W/cm$^2$, and 600 nm at 2 W/cm$^2$. In some embodiments, the intensity specified in the lock code may be relative intensity. For example, the lock code may use a 450 nm light beam or wavelength peak as the reference intensity, and specify that 500 nm should be 30% more intense, and 600 nm should be of equal intensity. In another example, the lock code may specify that 450 nm be the most intense, 500 nm should be second in intensity, and the 600 nm should be the least intense. The control device 214 may allow for a tolerance range when comparing the lock code with the light detected by the optical sensor. For example, if the wavelength peak of the detected light is within 5 nm of the wavelength specified in the lock code, the control device 214 may still determine to release the locking mechanism 216. In another example, if the intensities of each wavelength are below the specified value but the relative intensities approximately match the lock code, the control device 214 may still determine to release the locking mechanism.

In some embodiments, the optical key 220 may emit a calibration beam and/or a calibration sequence that allows the optical lock 210 to detect the possible degradation of and/or the ambient temperature's effect on the light source. The intensity and/or wavelength deviations detected through the calibration process may be used in the comparison of the detected light beam(s) and the lock code to account for variations in the emitted light due to light source degradation and/or other environmental effects. For example, if the calibration beam is 0.2 W/cm$^2$ less intense than expected, the optical lock may accept a detected beam that has an intensity around 0.2 W/cm$^2$ lower than the intensity specified in the lock code.

In some embodiments, the optical key 220 may adjust a tolerance level based on an environmental temperature either measured locally with a sensor or provided by a server. LED light sources, in particular, may have temperature dependent performance. The control circuit of the optical lock 210 may adjust the sensed wavelength and/or intensity values based on a temperature function prior to comparing the sensor reading to the locked code to account for this issue. For example, the circuit may add 10% to the intensity reading if the temperature is at 50° F. and add 20% to the intensity reading if the temperature is at 30° F. These values are provided as an example only, the actual temperature-based adjustment values and/or equations may be dependent on the light source used and/or factors.

In some embodiments, the optical lock 210 may blank the detected light beams) prior to comparing the beam(s) to the light code. The optical lock 210 may detect the constant background spectra shortly before and/or after detecting the light from the optical key 220. The constant background spectra may then be subtracted from the sensor reading to isolate out the wavelengths and intensities transmitted by the optical key 220.

While a lock code is described to contain a wavelength and intensity combination herein, the numerical value stored in the lock may correspond to frequency and/or wavelength represented in any unit measure. In some embodiment, when an array of optical sensors is used, the lock code may further specify a sensor/light source location of each wavelength and intensity combination. While intensity is described using the unit of W/cm2 herein, intensity may be implemented with radiance intensity measurement (W/sr), luminous intensity measurement (lm/sr or cd), photon count, etc. without departing from the spirit of the present disclosure. In some embodiments, the lock code may further include a modulation scheme and the control device 214 may further be configured to compare the modulation scheme specified in the lock code with the modulation of the light detected by the optical sensor. The modulation scheme may comprise one or more of phase, wavelength, and intensity changes over time.

The locking mechanism 216 may comprise any locking means such as a latch, a hook, a magnet, etc. that may be released by the control device 214. In some embodiments, the control device 214 may also be configured to engage the locking mechanism 216. In some embodiments, the locking mechanism 216 may be configured to be engaged manually. The locking mechanism 216 may be implemented on or with one or more of a display shelf, display case, portable case, single item casing, transportation container, storage container, storage shelf, a secured shopping space, and a secured storage space, etc. Generally, the locking mechanism 216 may control access to any merchandise in a supply and distribution chain and/or in a retail shopping facility.

In some embodiments, the optical lock 210 further comprises a communication device for communicating with an access server. The access server may provide the optical lock 210 with one or more lock codes that may be used to release the locking mechanism 216. In some embodiments, the optical lock 210 further communicates each unlock event to the access server such that the access server can keep track of each instant that the optical lock 210 is opened. In some embodiments, the optical lock 210 may also report any unsuccessful access attempts.

The optical key 220 comprises a light source 222, a control circuit 224, and a memory device 226. In some embodiments, the optical key 220 may be implemented with one or more of a portable device (e.g. portable scanner, reader, etc.) used by store associates or transportation workers, as an attachment, to the portable device, as part of a point of sales system (e.g. checkout counter, handheld or flatbed barcode scanner, etc.), and/or at a shipping and receiving facility.

The light source 222 may comprise one or more physical light emitting devices such as laser and LED. The light source 222 may emit light in visible and/or invisible wavelengths. In some embodiments, the light source 222 may include a light emitting device array in which each individual light emitting device may be configured to emit a light beam with fixed wavelength and variable intensity, fixed intensity and variable wavelength, or variable wavelength and intensity. In some embodiments, at least one of the light emitting device in the light source array may be a reference light source with fixed wavelength and/or intensity. The light emitting device array may be arranged in a pattern mirroring the pattern of the optical sensor devices of an optical lock such that each light emitting device is configured to direct a light beam towards a corresponding optical sensor device. The light source 222 may be configured to simultaneously emit a plurality of wavelengths each at a specified intensity as controlled by the control circuit 224. The light source 222 may further be configured to emit light according to a modulation scheme with varying phase, intensity, and/or wavelength as controlled by the control circuit 224. In some embodiments, the light source 222 may be implemented with and/or include laser lights for scanning machine readable codes such as barcodes, QR codes, etc.

The control circuit 224 may be any circuitry, such as a microprocessor, processor, and hardwired circuit that is configured to controls the light source 222. The control circuit 224 may be configured to retrieve a lock code from the memory device 226 and drive the light source 222 according to the lock code. The lock code may be downloaded to the memory device 226 via a wired or wireless connection. In some embodiments, the control circuit 224 may be configured to select a lock code from a plurality of lock codes stored in the memory device 226 based on the current time of day and/or the day of the week, month, year, etc. The lock code may specify sets of wavelength and intensity combinations and the control circuit 224 may be configured to drive the light source 222 to provide the specified wavelengths at the corresponding intensities. For example, the lock code may specify wavelength and intensity combinations of: 450 nm at 2 W/cm$^2$ a 500 nm at 3 W/cm$^2$, and a 600 nm at 2 W/cm$^2$. In some embodiments, the light source 222 comprises a single light emitting device and the control circuit 224 may cause the light source 222 to generate a light beam with 450 nm, 500 nm, and 600 nm wavelength peaks each having the specified intensity/amplitude. In some embodiment, an array of light emitting devices may be used and the lock code may further specify a location of each wavelength and intensity combination. The control circuit 224 may determine which light emitting device should generate which wavelength and intensity combination based on the lock code. In some embodiments, the control circuit 224 may select a light emitting device based on the wavelength or intensity of the lock code and only control the other of the wavelength and intensity. For example, the light source may include three light emitting devices with fixed 450 nm, 500 nm, and 600 nm wavelengths and the control circuit may cause each light emitting devices to generate light beams with the intensities of 2 $W/cm^2$, 3 $W/cm^2$, 1 $W/cm^2$ respectively. While a lock code is described to contain a wavelength and intensity combination herein, the numerical value stored in the lock may correspond to frequency and/or wavelength and absolute and/or relative intensity. While intensity is expressed with the unit $W/cm^2$ herein, intensity may be implemented with radiance intensity measurement (W/sr), luminous intensity measurement (lm/sr or cd), photon count, etc. without departing from the spirit of the present disclosure. In some embodiments, the lock code may further include a modulation scheme and the control circuit 224 may further be configured drive the light source 222 according to the modulation scheme specified in the lock code. The modulation scheme may comprise one or more of phase, wavelength, and intensity changes over time.

The memory device 226 may comprise any volatile and/or non-volatile machine readable storage device. The memory device 226 may be configured to store one or more lock codes accessible by the control circuit. In some embodiments, the memory device 226 only temporarily stores the lock code, and is configured to detect the lock code after a set number of uses, after a certain time, and/or after a user logs out of the portable device, etc.

In some embodiments, the optical key 220 further comprises a communication device for communicating with an access server. In some embodiments, a user of the optical key may submit an unlock request to the server. In some embodiments, the optical key 220 further includes a user interface for the user to provide authentication (e.g. password, login, etc.) prior to submitting the access request and/or operating the optical key 220. In some embodiments, the unlock request may be logged by the access server. In some embodiments, the unlock request may be required to include a number of items the user intends to remove or add to the locked space. In some embodiments, the unlock request identifies a specific optical lock the user wishes to access. For example, the user may scan or enter an identifier associated with the optical lock, merchandise, lock location etc. to indicate a specific optical lock to the access server. The access server may provide the optical key 220 with one or more lock codes for use with one or more optical locks 210. In some embodiments, the optical key 220 may also report any unsuccessful authentication attempts to the access server.

In some embodiments, the optical lock 210 may further comprise a light source configured to transmit an optical lock identifier to the optical key 220. In some embodiments, the light source of the optical lock 210 may comprise a device similar to one or more embodiments of the light source 222 described herein. In some embodiments, the optical key 220 may comprise an optical sensor configured to detect the optical lock identifier from the light source of the optical lock 210. In some embodiments, the optical sensor of the optical key 220 may comprise a device similar to one or more embodiments of the optical sensor 212 described herein.

In some embodiments, the optical key 220 may be configured to transmit an activation signal with the light source 222 to activate the light source on the optical lock 210. When the optical key 220 detects the optical lock identifier from the light source of the optical lock with its optical sensor, the optical key 220 may be configured to select a lock code based on the optical lock identifier. The optical key 220 may then control the light source 222 based on the lock code to unlock the optical lock 210.

Figure 3:
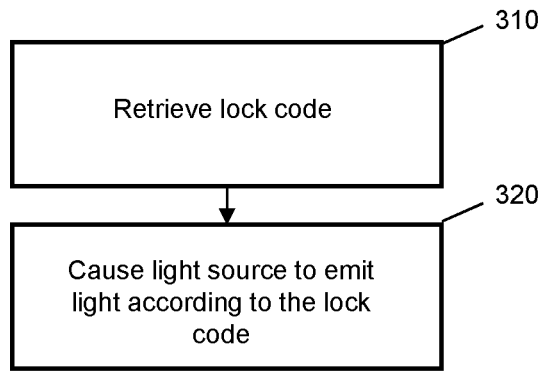
FIG. 3 is a flow diagram of a method for accessing merchandise in accordance with several embodiments.

Referring now to FIG. 3, a method for accessing locked merchandise is shown. Generally, the method shown in FIG. 3 may be implemented with an optical key having a control circuit and one or more light sources. In some embodiments, the method shown in FIG. 3 may be implemented with the optical key 130 shown in FIG. 1 and/or the optical key 220 shown in FIG.

In step 310, a lock code is retrieved. In some embodiments, prior to step 310, a store associate may be required to enter authorization credentials prior to operating the optical key. In some embodiments, the lock code may be retrieved from the memory device of the optical key and/or a server. In some embodiments, a lock code may be selected from a plurality of lock codes based on the lock to be opened, the current time of day, day of week, month and/or year etc. In some embodiments, a user may submit an unlock request to an access server to obtain a lock code. The lock code may be valid for only a specific lock or for multiple optical locks. The access request may specify one or more of a requesting user, a lock to be opened, one or more merchandise to be accessed, and the number of merchandise that will be added and/or removed. The lock code received from the access server may then be stored on a volatile and/or non-volatile memory device of the optical lock.

The lock code may specify two or more wavelengths and an intensity associated with each wavelength. In some embodiments, the wavelengths may also be expressed in term of frequencies in the lock code. The intensity may be expressed in a unit measurement ($W/cm^2$, photon count/nm, lm/sr, cd, and the like) and/or as relative values (high, medium, low, etc.) In some embodiments, the lock code may further include a modulation scheme that specifies how one or more of wavelength, intensity, and phase of one or more light beams should vary over time. In some embodiments, when an array of light emitting devices is used, the lock code may further specify a location within the array for each wavelength and intensity combination.

After a lock code is retrieved, the control circuit may determine how to drive the light source based on the lock code. In some embodiments, when a single light emitting device is used, the control circuit may determine which wavelengths to emit and determine an appropriate intensity for each wavelength peak. In some embodiments, when multiple light emitting devices are used, the system may determine which light source should emit which wavelength and intensity combination specified in the lock code.

In step 320, the control circuit causes the light source to emit one or more light beams according to the lock code. In some embodiments, step 320 may be initiated by a user pushing a button on the optical key. In some embodiments, the light source of the optical key may be activated in a similar manner as a hand held scanner. In some embodiments, step 320 may end when the button is released. In some embodiments, if the lock code specifies a modulation scheme, the control circuit may cause the light source to modulate according to the modulation scheme.

In some embodiments, after step 320, the optical key and/or the device including the optical key may be used to scan optical codes (barcodes, QR codes etc.) from the merchandise being removed or added to the lock space. The scanned information may be reported to the access server for logging. The laser for scanning the optical code may be part of or include the light source used to emit light beam(s) according to the lock code in step 320. In some embodiments, the lock code may be erased from the memory device of the optical code once it is used and/or after a preset period of time.

Figure 4:
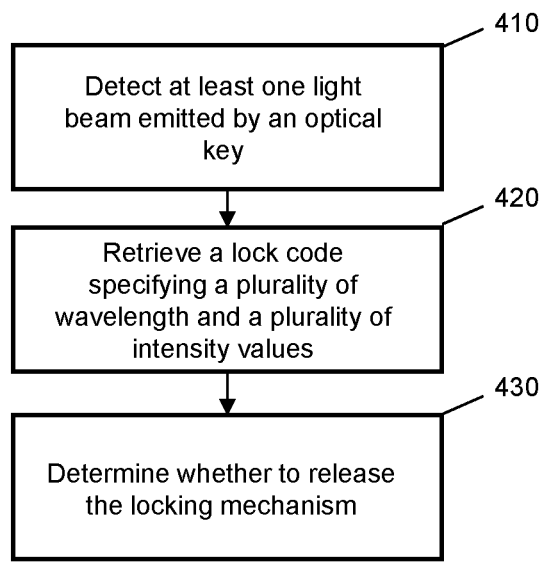
FIG. 4 is a flow diagram of a method for controlling access to merchandise in accordance with several embodiments.

Referring now to FIG. 4, a method for securing merchandise is shown. Generally, the method shown in FIG. 4 may be implemented with an optical lock having a control circuit, one or more light sources, and a locking mechanism. In some embodiments, the method shown in FIG. 4 may be implemented with the optical lock 120 shown in FIG. 1 and/or the optical lock 210 shown in FIG. 2.

In step 410, at least one light emitted by an optical key is detected. Light beam(s) from an optical key may be detected by a single sensor device such as a spectrometer or a plurality of separate sensor devices. In step 420, a lock code specifying a plurality of wavelengths and a plurality of intensity values each associated with a wavelength is retrieved. The lock code may be retrieved from a server and/or a memory device of the optical lock. In some embodiments, the lock code stored on the optical lock may be periodically updated by an access server. In some embodiments, lock code may be provided by the access server when a user requests access to the optical lock. In some embodiments, the optical lock may request a lock code when it detects the at least one light beam in step 410. In some embodiments, the optical lock may select from a plurality of lock codes in step 420 based on the time of day, the day of the week, month, year, etc.

In step 420, the control circuit determines whether to release the locking mechanism restricting access to merchandise based on whether the light beam(s) detected in step 410 matches the wavelength and intensity combinations specified in the lock code retrieved in step 420. In some embodiments, if the optical sensor is a spectrometer, the control circuit compares intensities of wavelength peaks of the spectrometer reading with the wavelength and intensity combinations in the lock code. In some embodiments, when multiple optical sensors are used, each optical sensor device may be configured to detect one wavelength and intensity combination from a light beam. In some embodiments, at least one of the optical sensors may be configured to measure the intensity of a narrow range of wavelengths. For example, one sensor may measure the intensity of light in the 600-650 nm range and a second sensor may measure the intensity of light in the 700-750 nm range. In some embodiments, the control circuit may allow for some tolerance in the wavelength and intensity comparison. For example, if the wavelength of the detected light and/or peak is within 5 nm of the wavelength specified in the lock code, the control circuit may still determine to release the locking mechanism. In some embodiments, the lock code specifies a modulation scheme, and control circuit may further determine whether the modulation of the detected light beam(s) matches the modulation scheme of the lock code in step 430.

If the light detected in step 410 matches the lock code retrieved in step 420, the control circuit may then release the locking mechanism to permit access to the locked merchandise. In some embodiments, the optical lock may report any successful and/or unsuccessful attempts to access the locked merchandise to the access server after step 430.

Figure 5:
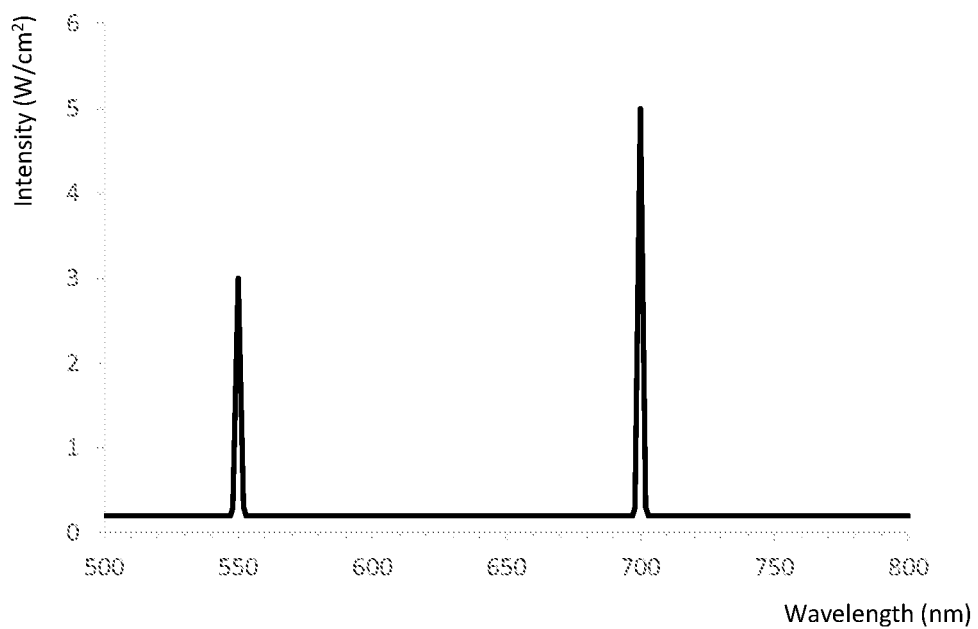
FIG. 5 is an illustration of a detected light beam in accordance with several embodiments.

Referring now to FIG. 5 an illustration of a spectrum of a detected light beam(s) is shown. The graph in FIG. 5 may represent a spectrometer reading from one or more laser light sources having a 500 nm peak at 3 W/cm$^2$ intensity and a 700 nm peak at 5 W/cm$^2$ intensity. For embodiments using other types of light sources, the wavelength distribution for each peak may be more spread out. In some embodiments, if a lock code specifies the combination of 3 W/cm$^2$ at 550 nm and 5 W/cm$^2$ at 700 nm and the spectrometer has a read out similar to FIG. 5, an optical lock may determine that the detected light beam matches the lock code and releases the locking mechanism to permit access to locked merchandise. In some embodiments, the detected light beam in FIG. 5 may also match a lock code that specifies peaks at 550 nm and 700 nm, with the 550 nm peak having a relative intensity of approximately 60% of the intensity of the 700 nm peak. An optical code may specify any number of wavelength and intensity combinations. The intensity values in the optical code may represent an absolute value or a relative value. In some embodiments, one wavelength peak may be a reference peak and the intensities values other wavelength peaks may be defined relative to the intensity of the reference peak. While FIG. 5 includes the visible wavelength spectrum, in some embodiments, wavelengths in the invisible spectrum (e.g. infrared, ultraviolet) may be used.

Figure 6:
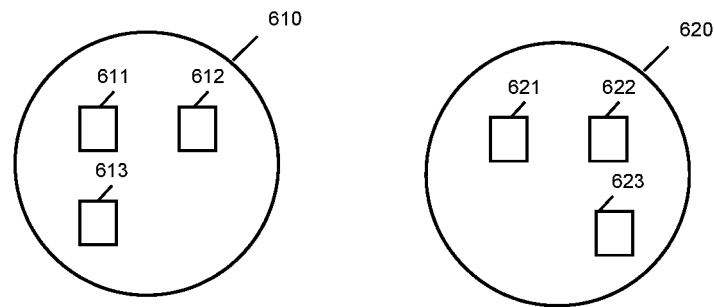
FIG. 6 is an illustration of a light sensor and a light source in accordance with several embodiments.

Referring now to FIG. 6, a pair of optical sensor and light source is shown. Optical sensor 610 includes three optical sensor devices 611, 612, and 613. Each of the sensor devices may be configured to detect one or more wavelength ranges and one or more intensity values. In some embodiments, each of the sensor devices 611, 612, and 613 may be a spectrometer. In some embodiments, each of the sensor devices 611, 612, and 613 may be configured to measure the intensity of one or more bands of wavelengths. The optical sensor devices 611, 612, and 613 are arranged in a pattern that mirrors the pattern of light emitting devices 621, 622, and 623 of the light source 620 such that when the light source 620 is pointed at the optical sensor 610, each of the optical sensor devices 611, 612, and 613 is positioned to measure a light beam from a corresponding one of the light-emitting device 621, 622, and 623.

The light emitting devices 621, 622, and 623 may include any light emitting device such as laser and/or LED. In some embodiments, each of the light emitting devices 621, 622, and 623 may be configured to generate a light beam with variable wavelength and intensity. In some embodiments, at least some of the light emitting devices 621, 622, and 623 may have fixed wavelength and/or intensity. In some embodiments, at least one of the light emitting devices 621, 622, and 623 may be a reference light source with a fixed intensity and/or wavelength. In some embodiments, at least one of the light emitting devices 621, 622, and 623 may be a laser light source of a barcode code scanner.

In FIG. 6, the layout of the optical sensor devices 611, 612, and 613 and the light emitting devices 621, 622, 623 are shown as an example only. An optical sensor 610 and a light source 620 may include any number of sensors and light emitting devices in any arrangement without departing from the spirit of the present disclosure.

In one embodiment, an apparatus for securing merchandise comprises a locking mechanism limiting access to one or more items, one or more optical sensors configured to detect a plurality of wavelengths and an intensity associated with each wavelength from at least one light beam emitted by an optical key, and a control device comprising a control circuit and a memory device. The control device being configured to store a lock code comprising a plurality of wavelength values and a plurality of intensity values each associated with a wavelength value on the memory device and determine whether to release the locking mechanism based on whether intensities of each of the plurality of wavelengths detected by the one or more optical sensors match the lock code.

In one embodiment, an apparatus for accessing locked merchandise comprise one or more light sources configured to emit a plurality of wavelengths each at a specified intensity, a memory device storing a lock code comprising a plurality of wavelength values and a plurality of intensity values each associated with a wavelength value, and a control circuit configured to cause the one or more light sources to emit at least one light beam according to the lock code to unlock an optical lock.

In one embodiment, a system for controlling access to merchandise comprise an optical key comprising one or more light sources configured to emit at least one light beam comprising a plurality of wavelengths each at a specified intensity, and an optical lock comprising one or more optical sensors configured to detect a plurality of wavelengths and an intensity associated with each wavelength from the optical key, wherein the optical lock is configured grant access to one or more locked items in the event that the least one light beam emitted by the optical key matches a lock code comprising a plurality of wavelength values and a plurality of intensity values each associated with a wavelength value.

In one embodiment, a method for securing merchandise comprise detecting, at one or more optical sensors, at least one light beam emitted by an optical key and detect a plurality of wavelengths and an intensity associated with each wavelength from the at least one light beam; retrieving, from a memory device, a lock code comprising a plurality of wavelength values and a plurality of intensity values each associated with a wavelength value; and determine whether to release a locking mechanism limiting access to one or more items based on whether intensities of the plurality of wavelengths detected by the one or more optical sensors match the lock code.

Figure 7:
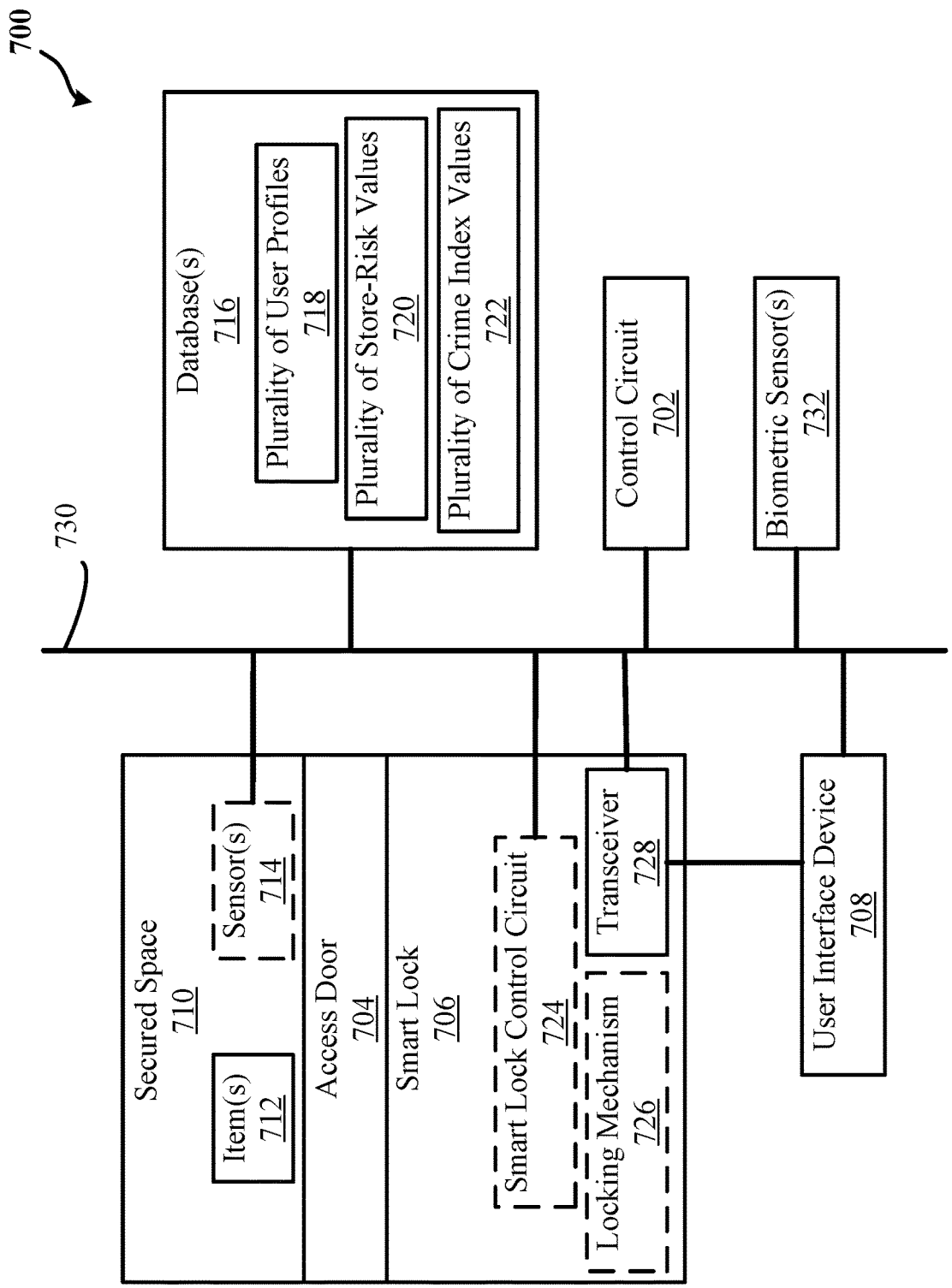
FIG. 7 is a block diagram in accordance with several embodiments.
Figure 8A:
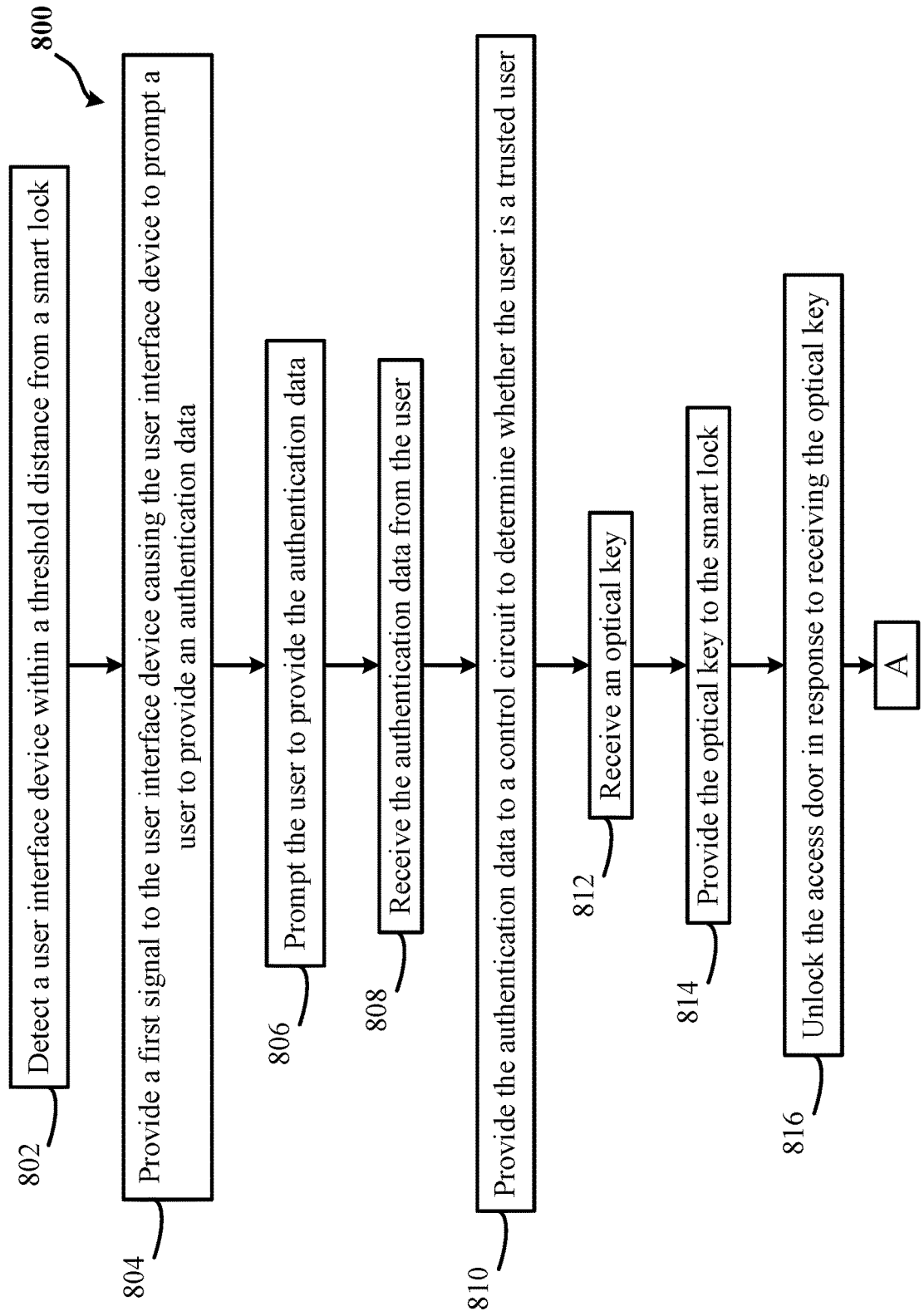
FIGS. 8A-8B is a flow diagram of a method in accordance with several embodiments.
Figure 8B:
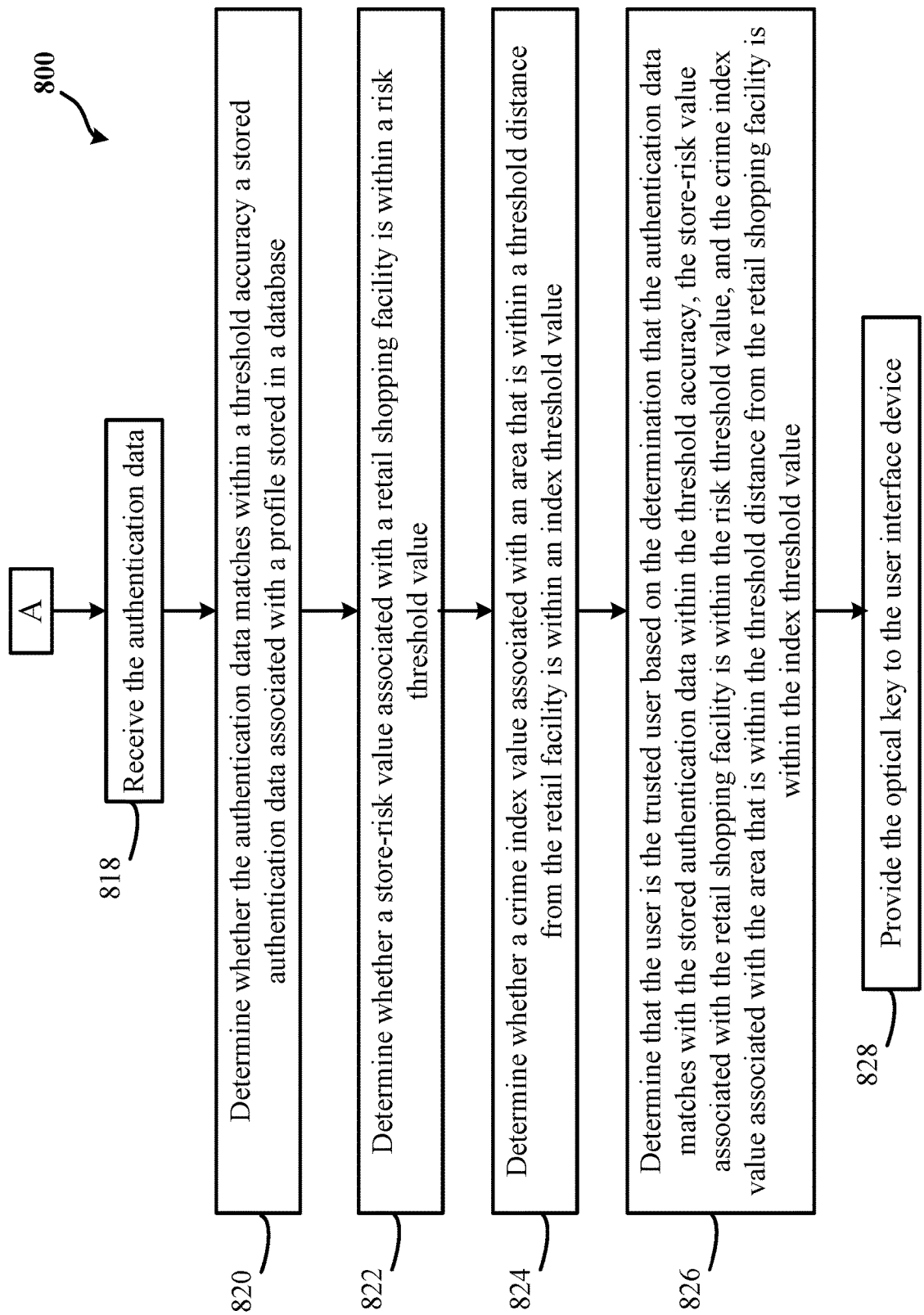
Figure 9:
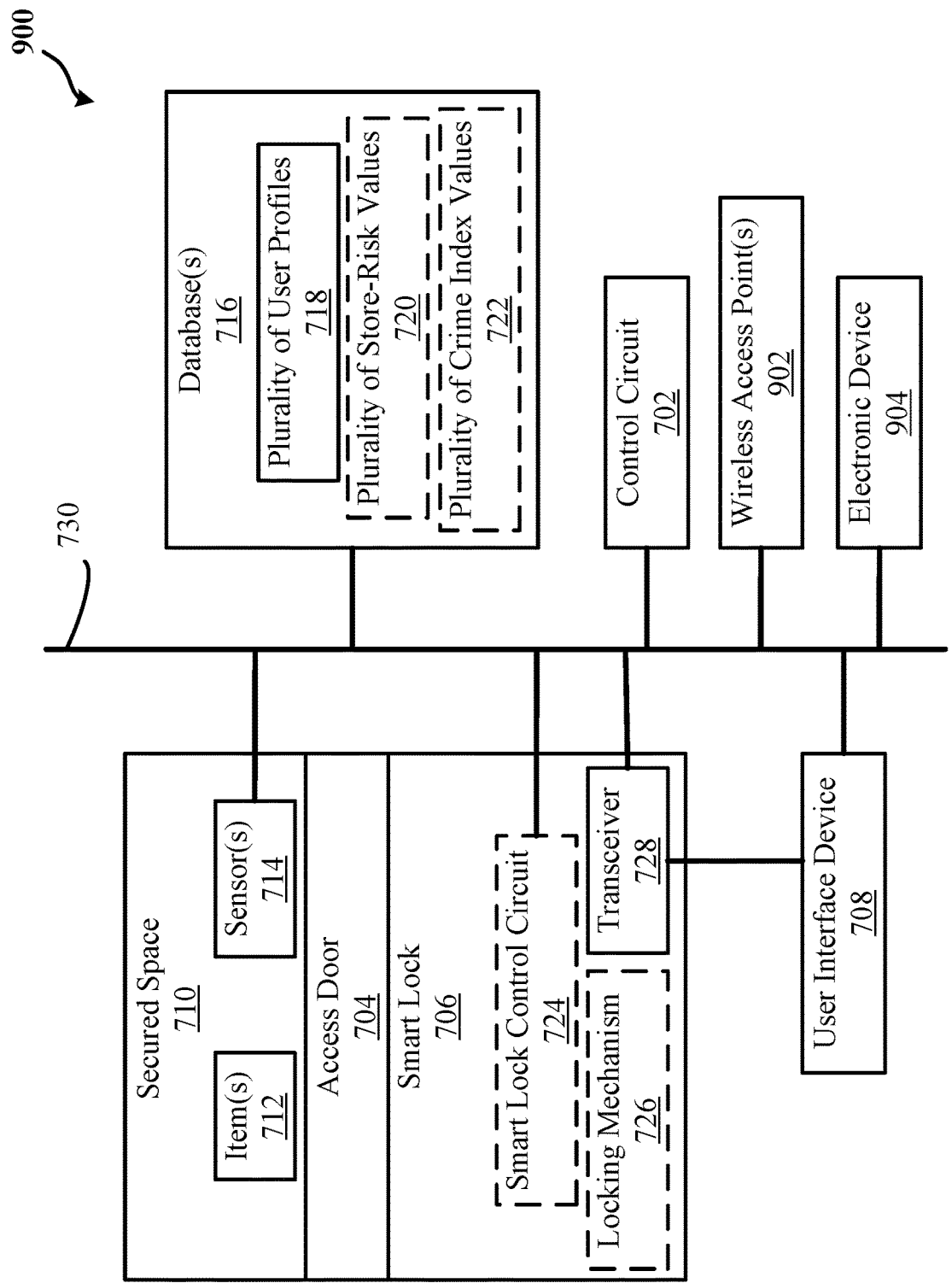
FIG. 9 is a block diagram in accordance with several embodiments.
Figure 10A:
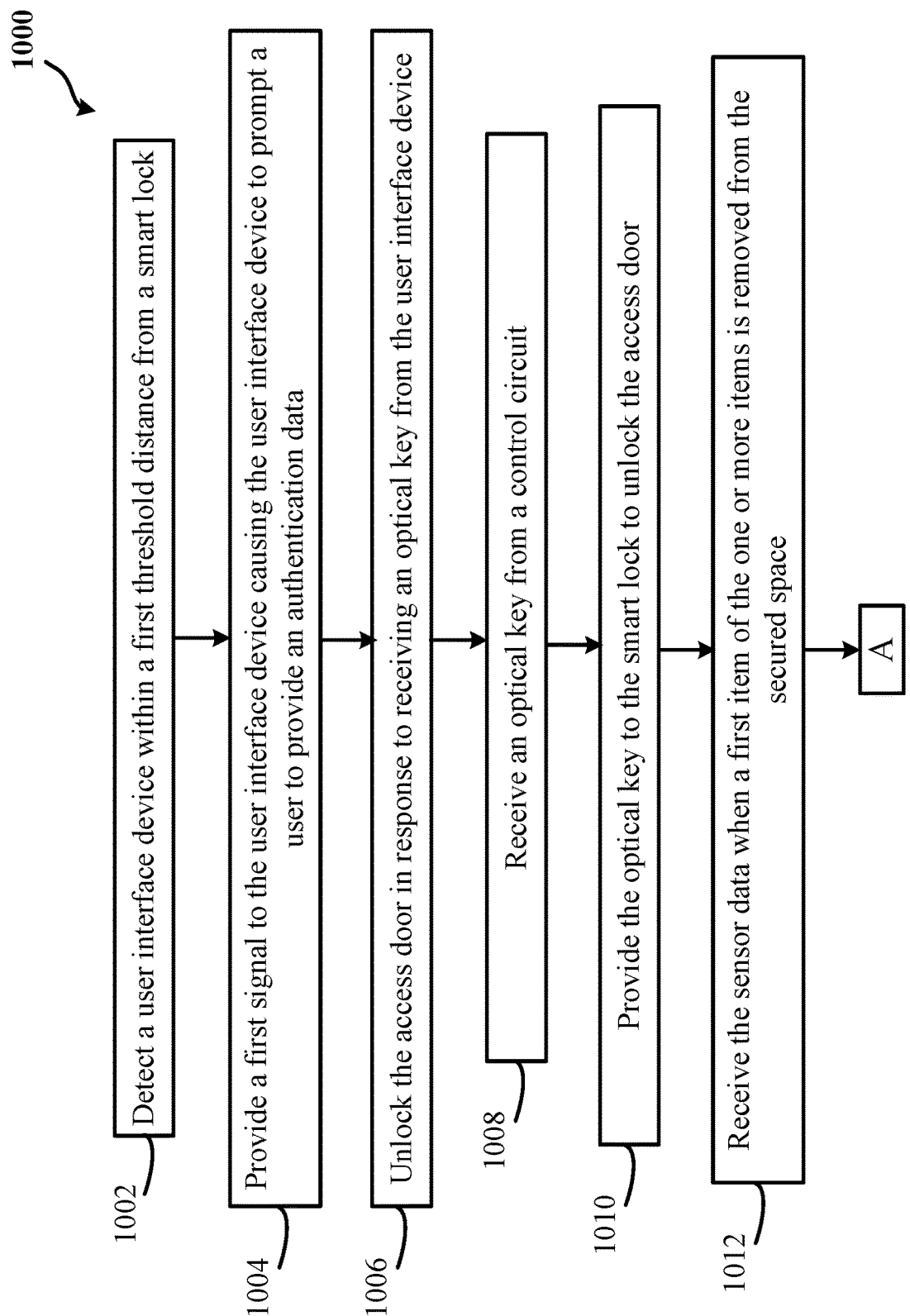
FIGS. 10A-10B is a flow diagram of a method in accordance with several embodiments.
Figure 10B:
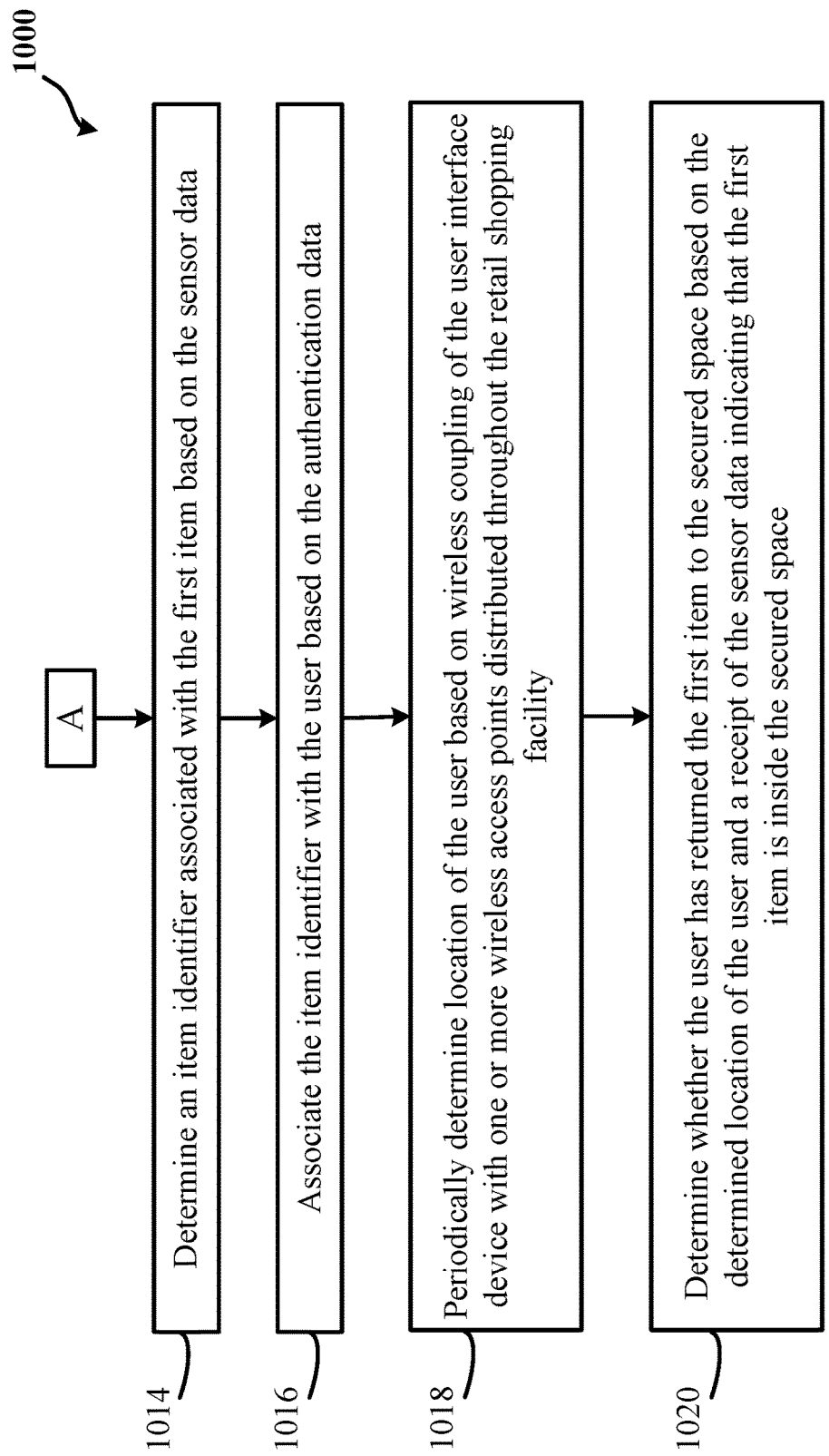
Figure 11:
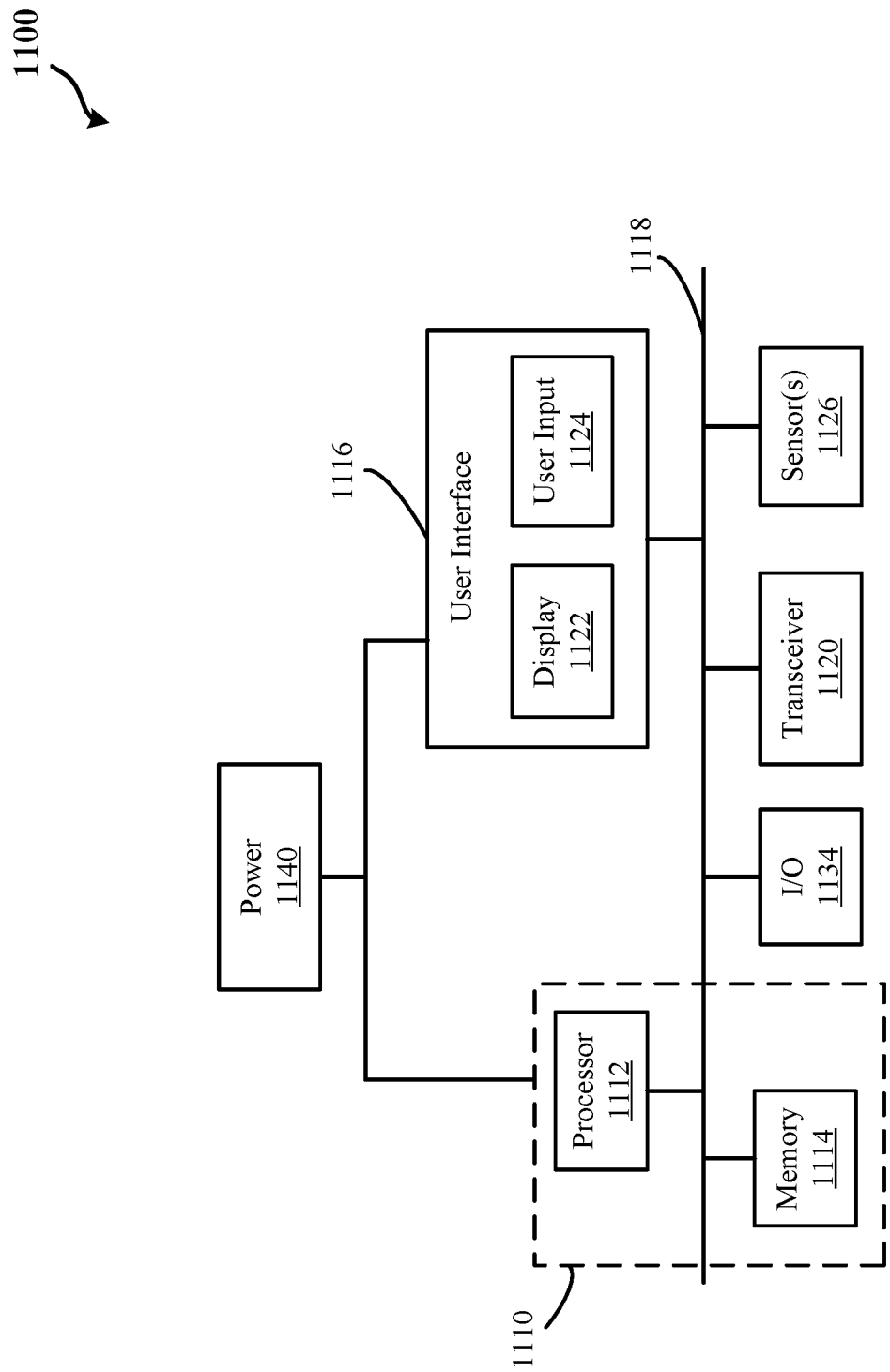
FIG. 11 illustrates an exemplary system for use in implementing methods, techniques, devices, apparatuses, systems, servers, sources and determining and executing trusted customer access and reporting access of a trusted-customer through an access door secured by a smart lock at a retail shopping facility, in accordance with some embodiments.

To further illustrate, FIGS. 7, 8A, 8B, 9, 10A, 10B, and 11 are described below. FIG. 7 is a block diagram of a system 700 in accordance with several embodiments. FIGS. 8A-8B is a flow diagram of a method 800, in accordance with several embodiments. FIG. 9 is a block diagram of a system 900 in accordance with several embodiments. FIGS. 10A-10B is a flow diagram of a method 1000, in accordance with several embodiments. FIG. 11 illustrates an exemplary system 1100 for use in implementing methods, techniques, devices, apparatuses, systems, servers, sources and determining and executing trusted customer access and reporting access of a trusted-customer through an access door secured by a smart lock at a retail shopping facility, in accordance with some embodiments. As an illustrative non-limiting example, FIG. 7 shows a system 700 that includes an access door 704 that allows access to a secured space 710. In one scenario, the secured space 710 may store one or more items 712 for sale at a retail shopping facility. In one configuration, the access door 704 may include a lid. In another configuration, the access door 704 may include a hinged barrier, a sliding barrier, and/or a revolving barrier to an entrance to a room and/or a storage container. In yet another configuration, the access door 704 may include a structure having one or more members that separate one or more areas and/or space from another area and/or space. For example, the storage container may include a glass display case, a shelf, a rack, and/or an enclosed container. In some implementations, the system 700 may include a smart lock 706 securing the access door 704. For example, the smart lock 706 may include an optical lock and/or an electronic lock. In one configuration, the optical lock may include a transceiver 728 that receives one or more wavelengths corresponding to a visible range and/or an infrared range of electromagnetic spectrum. Alternatively or in addition to, the smart lock 706 may include the transceiver 728, a locking mechanism 726, and/or a smart lock control circuit 724. For example, the locking mechanism 726 may include one or more mechanical and/or electrical components cooperatively working to enable the smart lock 706 to secure the secured space 710. In another example, the smart lock control circuit 724 may include one or more integrated circuits that processes and/or execute codes and/or instructions stored in a memory and/or received from another electrical components and/or user inputs. In yet another example, the smart lock control circuit 724 may include one or more processors, microcontrollers, and/or the like.

In one configuration, the smart lock 706 may detect a user interface device 708 within a threshold distance from the smart lock 706, at step 802. For example, the threshold distance may include within a sensing distance of a sensor (e.g., a proximity sensor) of the smart lock 706 and/or the access door 704. In another example, the user interface device 708 may include a geofencing feature that enables the user interface device 708 to announce its presence to the smart lock 706. In yet another example, the user interface device 708 may broadcast signal receivable by the transceiver 728 of the smart lock 706. In some implementations, the transceiver 728 may include one or more transmitters and/or receivers each configured to transmit and/or receive a particular electromagnetic signal. Alternatively or in addition to, the user interface device 708 may include a smartphone, a tablet, a laptop, a scanner, a smartwatch, an iPad, and/or any portable electronic device capable of being easily carried by a user from one place to another. By another approach, the user interface device 708 may be associated with a user. For example, the user may include a customer and/or an associate of the retail shopping facility. By another approach, the smart lock 706 may initiate communication with the user interface device 708 to determine whether the user is pre-authorized to access the secured space 710 in response to the detection of the user interface device 708. In such an approach, in response to the determination that the user is pre-authorized to access the secured space 710, the smart lock 706 may provide a first signal to the user interface device 708. By one approach, the smart lock 706 and the user interface device 708 may communicate via a second communication network (not shown) configured for close proximity communication between electronic devices, such the smart lock 706 and the user interface device 708, for example. In one scenario, the second communication network may include BLUETOOTH, peer to peer, and/or the like.

Alternatively or in addition to, the smart lock 706 may provide the first signal to the user interface device 708 causing the user interface device 708 to prompt a user to provide an authentication data, at step 804. For example, the authentication data may include biometric data (e.g., fingerprints, retinal scan, facial scan, voice recognition, and/or any physiological characteristics and/or behavioral features), password, and/or an authentication code. In some implementations, the system 700 may include the user interface device 708 operable by the user. By one approach, the user interface device 708 may prompt the user to provide the authentication data in response to a receipt of the first signal from the smart lock 706, at step 806. Alternatively or in addition to, the user interface device 708 may receive the authentication data from the user, at step 808. By one approach, the user interface device 708 may provide the authentication data to a control circuit 702 to determine whether the user is a trusted user, at step 810. For example, the trusted user may include a user having an automatically granted access to one or more secured spaces 710. In one scenario where the trusted user is a customer, granting an automatic access to one or more secured spaces 710 enables the trusted user to pick up one or more items 712 from the one or more secured spaces 710 without having to ask for assistance from an associate working at the retail shopping facility. As such, one of the many benefits of trusted user access is efficiency in the use of labor resources and/or labor pool at the retail shopping facility. In addition, trusted user access provides a more pleasant shopping experience for the customer through avoidance of unnecessary wait time for the customer since the customer is not having to wait for assistance in accessing a product the customer would like to inspect. In another scenario where the trusted user is an associate at the retail shopping facility, by granting an automatic access to one or more secured spaces 710, the associate may be more efficient in performing the associate's job. For example, the associate would not need to get a physical key from a supervisor and/or a drawer, thereby, saving the associate the time the associate would have wasted just by having to walk to the location of the physical key and/or search for the physical key. In addition, the trusted customer access may provide a more efficient way of controlling access to inventories and/or determining when, where, what, and/or who accessed the inventories.

By one approach, the user interface device 708 may receive an optical key from the control circuit 702 in response to the determination by the control circuit 702 that the user is a trusted user, at step 812. For example, the optical key may include a laser beam signal and/or an infrared signal transmitted by the user interface device 708. In another example, the optical key may include a barcode-type number and/or an image that an optical scanner coupled to the smart lock 706 and/or the access door 704 may scan. Alternatively or in addition to, the user interface device 708 may provide the optical key to the smart lock 706, at step 814. In one scenario, the smart lock 706 may unlock the access door 704 in response to receiving the optical key, at step 816.

In some implementations, the secured space 710 secured by the access door 704 and the smart lock 706 may include one or more sensors 714 providing sensor data corresponding to the one or more items 712 stored inside the secured space 710. By one approach, the sensor data may enable the control circuit 702 to determine whether an item of the one or more items 712 is removed and/or returned inside the secured space 710. In one scenario, one or more sensors 714 may include a radio frequency identification (RFID) reader, a weight sensor, among other types of sensors capable of detecting an item being removed and/or replaced inside the secured space 710. In one configuration, when a trusted user removes an item from the secured space 710, the one or more sensors 714 may detect the removal and send sensor data to the control circuit 702. In such a configuration, the control circuit 702 may process the received sensor data using known data processing techniques and/or algorithm to determine that an item has been removed. Alternatively or in addition to, the one or more sensors 714 may detect the return of the removed item and send sensor data to the control circuit 702. In such a configuration, the control circuit 702 may process the received sensor data using known data processing techniques and/or algorithm to determine that the item has been returned.

In some implementations, the control circuit 702 may communicatively couple to the user interface device 708 via a communication network 730. By one approach, the communication network 730 may include a wired and/or a wireless network, WIFI network, Internet, a local access network (LAN), among other types of communication network capable of providing a medium of communication between one electronic device and another electronic device. Alternatively or in addition to, the control circuit 702 may communicate to databases 716, the smart lock control circuit 724, and/or the transceiver 728. For example, the control circuit 702 may receive the authentication data from the user interface device 708 via the communication network 730, at step 818. By one approach, the control circuit 702 may determine whether the authentication data matches, within a threshold accuracy, a stored authentication data associated with a profile of a plurality of user profiles 718 stored in a database of a plurality of databases 716, at step 820. For example, the control circuit 702 may access the plurality of user profiles 718 stored in at least one of the databases 716 to determine which stored authentication data in the plurality of user profiles 718 the received authentication data matches within the threshold accuracy. In one configuration, each profile of the plurality of user profiles 718 may include biometric data, authentication code, and/or password associated with a particular user. In such a configuration, the particular user voluntarily provide data associated with its profile. For example, the particular user during a registration process may opt-in to provide the biometric data, authentication code, and/or password. In such an example, a particular profile may be associated with a particular user. Alternatively or in addition to, the control circuit 702 may determine whether a store-risk value of a plurality of store-risk values 720 associated with the retail shopping facility is within a risk threshold value, at step 822. For example, each of the plurality of store-risk values 720 may be based on historical shrinkage events associated with a particular retail shopping facility. In such an example, the shrinkage events may include shoplifting and employee theft. Thus, each store-risk value 720 may correspond to a risk tolerance that the particular retail shopping facility is willing to take in proving trusted customer access at its retail shopping facility. Alternatively or in addition to, the control circuit 702 may determine whether a crime index value of a plurality of crime index values 722 associated with an area that is within a threshold distance from the retail shopping facility is within an index threshold value, at step 824. For example, each of the plurality of crime index values 722 may be based on crime data associated with an area that is within a threshold distance from a particular retail shopping facility. Thus, each crime index value 722 may correspond to another risk tolerance that the particular retail shopping facility is willing to take in proving trusted customer access at its retail shopping facility. In one example, the crime data may include data provided by a third-party, data obtained from police crime data, and/or data from a statistical crime data analysis available publicly, and/or the like. Alternatively or in addition to, the control circuit 702 may determine that the user is a trusted user based on the determination that the authentication data matches with the stored authentication data within the threshold accuracy, the store-risk value associated with the retail shopping facility is within the risk threshold value, and/or the crime index value associated with the area that is within the threshold distance from the retail shopping facility is within the index threshold value, at step 826. Alternatively or in addition to, in response to the determination that the user is a trusted user, the control circuit 702 may assign and/or associate a trust value to the user. In one configuration, the control circuit 702 may store the associated trust value and recall and/or use and/or apply the trusted value whenever an automated access is associated with and/or a requirement of an access to a particular secured space 710. In some embodiments, the control circuit 702 may determine a trust value based on at least one of: customer's prior purchase history, items 712 stored in the secured space 710, customer's credentials, identification, and/or prior authorization (e.g., to pick up items for another customer, meeting age, legal, and/or item requirements, etc.), and data obtained from a third party and/or social websites. Alternatively or in addition to, the control circuit 702 may provide the optical key to the user interface device 708 in response to the determination by the control circuit 702 that the user is a trusted user.

Alternatively or in addition to, the control circuit 702 may provide the optical key to the user interface device 708 in response to the determination that the user is a trusted user, at step 828. In some embodiments, the system 700 may include one or more biometric sensors 732 coupled to the smart lock 706 and/or the access door 704. By one approach, the one or more biometric sensors 732 may capture biometric data of the user to provide additional verification that the user is the trusted user. For example, the one or more biometric sensors 732 may include a fingerprint scanner, a camera, among other types of electronic device capable of captured biometric data of a user. In one scenario, the smart lock control circuit 724 may process the biometric data captured by the one or more biometric sensors 732 using one or more image/data processing techniques and/or algorithm commercially available and may access the plurality of user profiles 718 and compare the resulting data with stored biometric data in one of the databases 716.

In an illustrative non-limiting; example, FIG. 9 illustrates a system 900 in accordance with several embodiments. By one approach, the system 900 may correspond to the system 700 with additional elements and/or functionality. In such an approach, some or all of the elements shown in FIG. 7 may correspond to the elements shown in FIG. 9. As such, descriptions of functionality and/or operations of the elements in system 700 may be applicable to the functionality and/or operations to some or all the elements in system 900. By another approach, the system 700 and the system 900 may each be independently implemented such that the system 700 may be implemented without reporting access to a secured space, for example, by a trusted-customer, a trusted user, and/or a user, as described below; while the system 900 may be implemented without determining and executing trusted customer access to a secured space, as described herein.

For example, the system 900 may include an access door 704 that allows access to a secured space 710. In one scenario, the secured space 710 may store one or more items 712 for sale at a retail shopping facility. In one example, the secured space 710 may include one or more sensors 714 configured to provide sensor data corresponding to the one or more items 712 stored inside the secured space 710. By one approach, the sensor data may enable the control circuit 702 to determine whether an item of the one or more items 712 is removed and/or returned inside the secured space 710. In one scenario, one or more sensors 714 may include a radio frequency identification (MID) reader, a weight sensor, among other types of sensors capable of detecting an item being removed and/or replaced inside the secured space 710. In one configuration, when a user removes an item from the secured space 710, the one or more sensors 714 may detect the removal and send sensor data to the control circuit 702. In such a configuration, the control circuit 702 may process the received sensor data using known data processing techniques and/or algorithm to determine that an item has been removed. Alternatively or in addition to, the one or more sensors 714 may detect the return of the removed item and send sensor data to the control circuit 702. In such a configuration, the control circuit 702 may process the received sensor data using known data processing techniques and/or algorithm to determine that the item has been returned.

By one approach, the system 900 may include a smart lock 706 securing the access door 704. In one configuration, the smart lock 706 may detect a user interface device 708 within a first threshold distance from the smart lock 706, at step 1002. For example, the threshold distance may include within a sensing distance of a sensor (e.g., a proximity sensor) of the smart lock 706 and/or the access door 704. In another example, the user interface device 708 may include a geofencing feature that enables the user interface device 708 to announce its presence to the smart lock 706. In yet another example, the user interface device 708 may broadcast signal receivable by the transceiver 728 of the smart lock 706. In some implementations, a transceiver 728 may include one or more transmitters and/or receivers each configured to transmit and/or receive a particular electromagnetic signal. Alternatively or in addition to, the user interface device 708 may include a smartphone, a tablet, a laptop, a scanner, a smartwatch, an iPad, and/or any portable electronic device capable of being easily carried by a user from one place to another. By another approach, the user interface device 708 may be associated with a user. For example, the user may include a customer and/or an associate of the retail shopping facility. By another approach, the smart lock 706 may initiate communication with the user interface device 708 to determine whether the user is pre-authorized to access the secured space 710 in response to the detection of the user interface device 708. In such an approach, in response to the determination that the user is pre-authorized to access the secured space 710, the smart lock 706 may provide a first signal to the user interface device 708.

Alternatively or in addition to, the smart lock 706 may provide a first signal to the user interface device 708 causing the user interface device 708 to prompt a user to provide an authentication data, at step 1004. For example, the authentication data may include biometric data (e.g., fingerprints, retinal scan, facial scan, voice recognition, and/or any physiological characteristics and/or behavioral features), password, and/or an authentication code. In some implementations, the system 900 may include the user interface device 708 operable by the user. By one approach, the user interface device 708 may prompt the user to provide the authentication data in response to a receipt of the first signal from the smart lock 706. Alternatively or in addition to, the user interface device 708 may receive the authentication data from the user. By one approach, the user interface device 708 may provide the authentication data to a control circuit 702 to determine whether the user is a trusted user and/or whether the user is pre-authorized to access the secured space 710. For example, a user may have an automatically granted access to one or more secured spaces 710. In such an example, the control circuit 702 may provide an optical key that is associated with one or more particular secured spaces 710 such than when the user is within a threshold distance from the smart lock 706 securing one of the one or more particular secured spaces 710 (e.g., secured spaces 710 that had been pre-authorized to be accessed by the user), the smart lock 706 may provide a signal to the user interface device 708 causing the user interface device 708 to prompt the user to provide an authentication data. In response, the control circuit 702 may receive the authentication data and determine and/or verify whether the authentication data matches with one of the user of the plurality of user profiles 718 as having a pre-authorized access. By one approach, the smart lock 706 and the user interface device 708 may communicate via a second communication network (not shown) configured for close proximity communication between electronic devices, such the smart lock 706 and the user interface device 708, for example. In one scenario, the second communication network may include BLUETOOTH, peer to peer, and/or the like.

The systems and methods described herein can be configured to comply with privacy requirements which may vary between jurisdictions. For example, before any recording, collection, capturing or processing of user biometric data, a "consent to capture" process may be implemented. In such a process, consent may be obtained, from the user, via a registration process. Part of the registration process may be to ensure compliance with the appropriate privacy laws for the location where applicable. The registration process may include certain notices and disclosures made to the user prior to the user recording the user's consent. No unauthorized collection or processing of biometric data of individuals occurs via exemplary systems and methods.

After registration, and before collection or processing of biometric data of the user occurs, a verification of the user as registered with the system and providing the required consents can occur. That is, the user's registration status as having consented to the collection of biometric data can be verified prior to collecting any biometric data. This verification can take place, for example, by the user entering a PIN (Personal Identification Number), password, and/or other code into a keypad, keyboard, or touch screen; by the user entering into a limited geofence location while carrying a fob, mobile device (such as a smartphone), or other RF transmitter, where the device has been configured to broadcast an authorization signal.

Once consent is verified, biometric data of the user may be captured, processed and used. Absent verification of consent, the camera, sensor, and/or other biometric data collection system may remain turned off. Once consent is verified, the camera, sensor and/or other biometric data collection system may be activated or turned on. If any biometric data is inadvertently collected from the user prior to verification of consent, the collected biometric data may be immediately deleted, not having been saved to disk.

In some embodiments, any biometric data captured as part of the verification process is handled and stored by a single party at a single location. In some other embodiments where data must be transmitted to an offsite location for verification, certain disclosures prior to consent may be required, and the biometric data is encrypted. For example, the hashing of the biometric data received is a form of asymmetrical encryption which improves both data security and privacy, as well as reducing the amount of data which needs to be communicated.

By one approach, upon a determination that the user is associated with a user as having a pre-authorized access based on the verification of the authentication data, the control circuit 702 may provide the optical key to the smart lock 706 to unlock the access door 704. In one scenario where an automatic access to one or more secured spaces 710 is only allowed to a trusted user, the control circuit 702 may determine whether a user is a trusted user as previously described above. Thus, by granting automatic access to one or more secured spaces 710 to a user that is a customer provides enables the user to pick up one or more items 712 from the one or more secured spaces 710 without having to ask for assistance from an associate working at the retail shopping facility. Thus, during a busy time and/or day, the retail shopping facility may provide automatic access as described above to a customer, thereby freeing up associates to perform other work and/or function in the retail shopping facility. As such, providing a more pleasant shopping experience for the customer through avoidance of unnecessary wait time for the customer since the customer is not having to wait for assistance in accessing a product the customer would like to have access to and/or inspect. In another scenario where the user is an associate at the retail shopping facility, by granting an automatic access to one or more secured spaces 710, the retail shopping facility may better allocate available labor resources (e.g., associates, managers, among other employees and/or contractor of the retail shopping facility) to other areas of the retail shopping facility, thereby, enabling the retail shopping facility to be efficient in allocating its labor resources. In addition, by proving automatic access, the retail shopping facility may realize a better way to keep track of inventories and/or determining when the inventories are accessed, where the inventories are accessed, what inventories are accessed, and/or who accessed the inventories. Thus, the control circuit 702 may provide a report to a particular associate (e.g., associate in security, loss prevention, managers, supervisors, etc.) at the retail shopping facility based on data obtained by tracking the inventories based on unlocking and/or relocking of the smart lock 706. In one example, the report may include patterns of movement of inventories and/or associations of the patterns of movement of inventories with one or more user. In some implementations, the patterns of movement of inventories may include shrinkage, job performance, busy time, shortage of labor resource, uptick in sales, etc.) Alternatively or in addition to, the report may include which access door 704 is accessed, items associated with the access door 704, when the access door 704 is accessed (e.g., time of day, date, etc.), how long was the access door 704 unlock, and/or who accessed the inventories. Alternatively or in addition to, the report may be provided to a particular associate of the retail shopping facility periodically. In some configurations, the report may be associated with point-of-sale data of particular items.

By one approach, the user interface device 708 may receive the optical key from the control circuit 702. For example, the optical key may include a laser beam signal and/or an infrared signal transmitted by the user interface device 708. In another example, the optical key may include a barcode-type number and/or an image that an optical scanner coupled to the smart lock 706 and/or the access door 704 may scan. Alternatively or in addition to, the user interface device 708 may provide the optical key to the smart lock 706. In some scenarios, the optical key may be associated with a particular smart lock 706 such that the optical key is paired with the particular smart lock 706. As such, the access door 704 may not be unlock if the smart lock 706 securing such access door 704 is not paired with the optical key. In some configuration, one or more sensors (e.g., an accelerometer sensor, and/or sensors capable of detecting jolting, shaking, forcible unlocking, and/or rapid swaying) coupled to the smart lock 706 and/or the access door 704 and may provide sensor data to the control circuit 702 indicative of possible tampering of the smart lock 706 and/or the access door 704.

In one configuration, the smart lock 706 may unlock the access door 704 in response to receiving an optical key from the user interface device 708, at step 1006. In some implementations, the system 900 may include the user interface device 708 operable by the user. By one approach, the user interface device 708 may receive the optical key from the control circuit 702, at step 1008. Alternatively or in addition to, the user interface device 708 may provide the optical key to the smart lock 706 to unlock the access door 704, at step 1010. In some implementations, the optical key may include reason code (e.g., to make a sale, to restock, etc.) provided by the user prior to, concurrent with, and/or after providing the authentication data to the user interface device 708. In some scenarios, the smart lock 706 may keep the access door 704 unlock for a particular period of time. In another scenarios, the smart lock 706 may automatically relock if it has been unlocked for a predetermined period of time.

In some implementations, the system 900 may include the control circuit 702 communicatively coupled to the user interface device 708 and/or the one or more sensors 714 inside the secured space 710. By one approach, the control circuit 702 may receive the sensor data when a first item of the one or more items 712 is removed from the secured space 710, at step 1012. In one configuration, the control circuit 702 may determine an item identifier associated with the item based on the sensor data in response to the receipt of the sensor data, at step 1014. For example, an RFID reader may scan the item identifier as the item is being removed by the user from the secured space 710. Alternatively or in addition to, the control circuit 702 may associate the item identifier with the user based on the authentication data, at step 1016. By one approach, the control circuit 702 may periodically determine location of the user based on wireless coupling of the user interface device 708 with one or more wireless access points 902 distributed throughout the retail shopping facility, at step 1018. For example, the one or more wireless access points 902 may be distributed throughout the retail shopping facility. By one approach, the one or more wireless access points 902 may include a WIN access point, a beacon access point, a BLUETOOTH access point, and/or other types of wireless access points having communication protocols configured to allow the user interface device 708 to communicate with and/or tracked by the control circuit 102. In some implementations, the control circuit 702 may determine whether the user has returned an item previously removed back to the secured space 710 based on the determined location of the user and/or a receipt of the sensor data provided by the one or more sensors 714 indicating that the item is inside the secured space 710, at step 1020.

In some embodiments, the control circuit 702 may determine whether a user is within a second threshold distance from an exit door of the retail shopping facility based on a determined location of the user. For example, as the user strolls across and/or within the retail shopping facility, the user interface device 708 may communicatively couple and decouple with a first wireless access point of the one or more wireless access points 902 and subsequently couple and decouple with a second wireless access point of the one or more wireless access points 902 as the user interface device 708 goes in and/or out of a sensing distance and/or coverage area of the first wireless access point and the second wireless access point. As such, the control circuit 702 may determine the whereabouts and/or location of the user inside the retail shopping facility based on which wireless access point is the user interface device 708 coupled to and/or the corresponding coverage area associated with such wireless access point. In response to the determination that the user is within a second threshold distance from an exit door, the control circuit 702 may provide a message to an electronic device 904 associated with a security-associate of the retail shopping facility alerting the security-associate of possible theft of an item removed from the secured space 710. By one approach, the electronic device 904 may include a laptop, a smartphone, a computer, a tablet, among other types of electronic device capable of displaying messages to an associate at a retail shopping facility. By another approach, in response to the determination that the user is within a second threshold distance from an exit door, the control circuit 702 may determine whether the user associated with the user interface device 708 has purchased the item based on an access to a point-of-sale system and/or server. In such an approach, upon a determination by the control circuit 702 that the user has not made a purchase of the item and/or pay for the item, the control circuit 702 may provide the message to the electronic device 904 associated with the security-associate.

In some implementations, the control circuit 702 may initially associate an item 712 removed from the secured space 710 with a user based on an authentication data provided by the user to unlock the smart lock 706. Alternatively or in addition, the control circuit 702 may associate the user and/or the item 712 with the user interface device 708 used to provide the authentication data and/or the optical key. Alternatively or in addition, the control circuit 702 may associate the user, the item 712, and/or the user interface device 708 with the wireless access point 902 that the user interface device 708 is coupled to communicate with the control circuit 702 and/or receive the optical key from the control circuit 702. As such, the control circuit 702 may track the location of the item and/or the user in the retail shopping facility. Thus, the control circuit 702 may determine whether the user and/or the item is within a threshold distance from an exit door based on the one or more associations of the user, the item 712, the user interface device 708, and/or the wireless access point 902. By one approach, upon a determination by the control circuit 702 that the user and/or the item is within a threshold distance from an exit door, the control circuit 702 may provide a message to the electronic device 904 alerting one or more associates in the retail shopping facility that there may be a possible theft of the item. In one configuration, the message may include an item identifier associated with the item and/or a photograph (e.g., a photo, a picture, and/or the like) of the user based on a profile of the user stored in one of the databases 716 communicatively coupled with the control circuit 702 via the communication network 730. In yet another configuration, the control circuit 702 may provide the message to one or more associates based on a plurality of alert messages in accordance with the urgency to address a content of the message. For example, a message is initially sent by the control circuit 702 to an electronic device 904 associated with a first response loss prevention associate. Upon a determination by the control circuit 702 that the first message has not been addressed by the first response loss prevention associate, the control circuit 702 may provide the message to a second response loss prevention associate and/or subsequently to a next response loss prevention associate until the message is addressed. By one approach, the message may be addressed via an input by a responding loss prevention associate through the electronic device 904 associated with the responding loss prevention associate.

Further, the circuits, circuitry, systems, devices, processes, methods, techniques, functionality, services, servers, sources and the like described herein may be utilized, implemented and/or run on many different types of devices and/or systems. FIG. 11 illustrates an exemplary system 1100 that may be used for implementing any of the components, circuits, circuitry, systems, functionality, apparatuses, processes, or devices of the system 700 of FIG. 1, the method 800 of FIGS. 8A and 8B, the system 900 of FIG. 9, the method 900 of FIGS. 9A and 9B, and/or other above or below mentioned systems or devices, or parts of such circuits, circuitry, functionality, systems, apparatuses, processes, or devices. For example, the system 1100 may be used to implement some or all of the system for determining and executing trusted customer access for smart locks and/or reporting access of a trusted-customer through an access door secured by a smart lock at a retail shopping facility, the smart lock 706, the user interface device 708, the control circuit 702, the databases 716, the smart lock control circuit 724, the transceiver 728, the communication network 730, the one or more biometric sensors 732, the one or more sensors 714, the one or more wireless access points 902, the electronic device 904, and/or other such components, circuitry, functionality and/or devices. However, the use of the system 1100 or any portion thereof is certainly not required.

By way of example, the system 1100 may comprise a processor module (or a control circuit) 1112, memory 1114, and one or more communication links, paths, buses or the like 1118. Some embodiments may include one or more user interfaces 1116, and/or one or more internal and/or external power sources or supplies 1140. The control circuit 1112 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1112 can be part of control circuitry and/or a control system 1110, which may be implemented through one or more processors with access to one or more memory 1114 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1100 may be used to implement one or more of the above or below, or parts of, components, circuits, systems, processes and the like. For example, the system 1100 may implement the system for determining and executing trusted customer access for smart locks and/or reporting access of a trusted-customer through an access door secured by a smart lock at a retail shopping facility with the control circuit 702, the user interface device 708, and/or the smart lock control circuit 724 being the control circuit 1112.

The user interface 1116 can allow a user to interact with the system 1100 and receive information through the system. In some instances, the user interface 1116 includes a display 1122 and/or one or more user inputs 1124, such as buttons, touch screen, track ball, keyboard, mouse, etc., which can be part of or wired or wirelessly coupled with the system 1100. Typically, the system 1100 further includes one or more communication interfaces, ports, transceivers 1120 and the like allowing the system 1100 to communicate over a communication bus, a distributed computer and/or communication network (e.g., a local area network (LAN), the Internet, wide area network (WAN), etc.), communication link 1118, other networks or communication channels with other devices and/or other such communications or combination of two or more of such communication methods. Further the transceiver 1120 can be configured for wired, wireless, optical, fiber optical cable, satellite, or other such communication configurations or combinations of two or more of such communications. Some embodiments include one or more input/output (I/O) interface 1134 that allow one or more devices to couple with the system 1100. The I/O interface can be substantially any relevant port or combinations of ports, such as but not limited to USB, Ethernet, or other such ports. The I/O interface 1134 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1126 to provide information to the system and/or sensor information that is communicated to another component, such as the control circuit 702, the smart lock control circuit 724, user interface device 708, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1100 comprises an example of a control and/or processor-based system with the control circuit 1112. Again, the control circuit 1112 can be implemented through one or more processors, controllers, central processing units, logic, software and the like. Further, in some implementations the control circuit 1112 may provide multiprocessor functionality.

The memory 1114, which can be accessed by the control circuit 1112, typically includes one or more processor readable and/or computer readable media accessed by at least the control circuit 1112, and can include volatile and/or non-volatile media, such as RAM, ROM, EEPROM, flash memory and/or other memory technology. Further, the memory 1114 is shown as internal to the control system 1110; however, the memory 1114 can be internal, external or a combination of internal and external memory. Similarly, some or all of the memory 1114 can be internal, external or a combination of internal and external memory of the control circuit 1112. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1114 can store code, software, executables, scripts, data, content, lists, programming, programs, log or history data, user information, customer information, product information, and the like. While FIG. 11 illustrates the various components being coupled together via a bus, it is understood that the various components may actually be coupled to the control circuit and/or one or more other components directly.

In some embodiments, a system for reporting access of a trusted-customer through an access door secured by a smart lock. The system includes an access door that allows access to a secured space configured to store one or more items for sale at a retail shopping facility. By one approach, the secure space includes one or more sensors configured to provide sensor data corresponding to the one or more items stored inside the secured space. In some embodiments, the system includes a smart lock securing the access door. The smart lock detects a user interface device within a first threshold distance from the smart lock. In some embodiments, the smart lock provides a first signal to the user interface device causing the user interface device to prompt a user to provide an authentication data. In some embodiments, the smart lock unlocks the access door in response to receiving an optical key from the user interface device. In some embodiments, the system includes the user interface device operable by the user. In some embodiments, the user interface device receives the optical key from a control circuit. In some embodiments, the user interface device provides the optical key to the smart lock to unlock the access door. In some embodiments, the system includes the control circuit communicatively coupled to the user interface device and the one or more sensors inside the secured space. In some embodiments, the control circuit receives the sensor data when a first item of the one or more items is removed from the secured space. In some embodiments, the control circuit, in response to the receipt of the sensor data, determines an item identifier associated with the item based on the sensor data. In some embodiments, the control circuit associates the item identifier with the user based on the authentication data. In some embodiments, the control circuit periodically determines location of the user based on wireless coupling of the user interface device with one or more wireless access points distributed throughout the retail shopping facility. In some embodiments, the control circuit determines whether the user has returned the first item to the secured space based on the determined location of the user and a receipt of the sensor data indicating that the item is inside the secured space.

In some embodiments, the access door includes a lid, a hinged barrier, a sliding barrier, a revolving barrier to at least one of: an entrance to a room and a storage container. In some embodiments, the storage container includes a glass display case, a shelf, a rack, and/or an enclosed container. In some embodiments, the authentication data includes biometric data, password, and/or an authentication code. In some embodiments, the smart lock includes an optical lock and/or an electronic lock. In some embodiments, the optical lock includes a transceiver that receives one or more wavelengths corresponding to at least one of a visible range and an infrared range of electromagnetic spectrum. In some embodiments, the smart lock includes a transceiver, a locking mechanism, and/or a smart lock control circuit. In some embodiments, the optical key comprises one of a laser beam signal and an infrared signal transmitted by the user interface device.

In some embodiments, the system includes the one or more wireless access points distributed throughout the retail shopping facility. In some embodiments, the one or more wireless access points includes a WIFI access point, a beacon access point, and/or a BLUETOOTH access point. In some embodiments, the control circuit determines whether the user is within a second threshold distance from an exit door of the retail shopping facility based on the determined location of the user. In some embodiments, the control circuit, in response to the determination that the user is within the second threshold distance from the exit door, provides a message to an electronic device associated with a security-associate of the retail shopping facility alerting the security-associate of possible theft of the first item. In some embodiments, the message includes the item identifier and/or a photo of the user based on a profile stored in a database communicatively coupled with the control circuit. In some embodiments, the system includes the control circuit communicatively coupled to the user interface device. In some embodiments, the control circuit receives the authentication data from the user interface device. In some embodiments, the control circuit determines whether the authentication data matches within a threshold accuracy a stored authentication data associated with a profile stored in a database. In some embodiments, the profile is associated with the user. In some embodiments, the control circuit determines whether a store-risk value associated with the retail shopping facility is within a risk threshold value. In some embodiments, the control circuit determines whether a crime index value associated with an area that is within a third threshold distance from the retail shopping facility is within an index threshold value. In some embodiments, the control circuit determines that the user is a trusted user based on the determination that the authentication data matches with the stored authentication data within the threshold accuracy, the store-risk value associated with the retail shopping facility is within the risk threshold value, and/or the crime index value associated with the area that is within the third threshold distance from the retail shopping facility is within the index threshold value. In some embodiments, the control circuit provides the optical key to the user interface device.

In some embodiments, the user interface device, in response to a receipt of the first signal from the smart lock, prompts the user to provide the authentication data. In some embodiments, the user interface device receives the authentication data from the user. In some embodiments, the user interface device provides the authentication data to the control circuit to determine whether the user is the trusted user. In some embodiments, the user interface device, in response to the determination by the control circuit that the user is the trusted user, receives an optical key from the control circuit.

In some embodiments, a method for reporting access of a trusted-customer through an access door secured by a smart lock. In some embodiments, the method includes detecting, by a smart lock securing an access door that allows access to a secured space configured to store one or more items for sale at a retail shopping facility, a user interface device within a first threshold distance from the smart lock. In some embodiments, the secure space includes one or more sensors configured to provide sensor data corresponding to the one or more items stored inside the secured space. In some embodiments, the method includes providing, by the smart lock, a first signal to the user interface device causing the user interface device to prompt a user to provide an authentication data. In some embodiments, the method includes unlocking, by the smart lock, the access door in response to receiving an optical key from the user interface device. In some embodiments, the method includes receiving, by the user interface device, an optical key from a control circuit. In some embodiments, the method includes providing, by the user interface device, the optical key to the smart lock to unlock the access door. In some embodiments, the method includes receiving, by the control circuit communicatively coupled to the user interface device and the one or more sensors inside the secured space, the sensor data when a first item of the one or more items is removed from the secured space. In some embodiments, the method includes, in response to receiving the sensor data, determining, by the control circuit, an item identifier associated with the first item based on the sensor data. In some embodiments, the method includes associating, by the control circuit, the item identifier with the user based on the authentication data. In some embodiments, the method includes periodically determining, by the control circuit, location of the user based on wireless coupling of the user interface device with one or more wireless access points distributed throughout the retail shopping facility. In some embodiments, the method includes determining, by the control circuit, whether the user has returned the first item to the secured space based on the determined location of the user and a receipt of the sensor data indicating that the first item is inside the secured space. In some embodiments, the one or more wireless access points includes a WIFI access point, a beacon access point, and/or a BLUETOOTH access point.

In some embodiments, the method includes determining, by the control circuit, whether the user is within a second threshold distance from an exit door of the retail shopping facility based on the determined location of the user. In some embodiments, the method includes, in response to determining that the user is within the second threshold distance from the exit door, providing, by the control circuit, a message to an electronic device associated with a security-associate of the retail shopping facility alerting the security-associate of possible theft of the first item. In some embodiments, the method includes receiving, by the control circuit, the authentication data. In some embodiments, the method includes determining, by the control circuit, whether the authentication data matches within a threshold accuracy a stored authentication data associated with a profile stored in a database. In some embodiments, the profile is associated with the user. In some embodiments, the method includes determining, by the control circuit, whether a store-risk value associated with the retail shopping facility is within a risk threshold value. In some embodiments, the method includes determining, by the control circuit, whether a crime index value associated with an area that is within a third threshold distance from the retail shopping facility is within an index threshold value. In some embodiments, the method includes determining, by the control circuit, that the user is a trusted user based on the determination that the authentication data matches with the stored authentication data within the threshold accuracy, the store-risk value associated with the retail shopping facility is within the risk threshold value, and/or the crime index value associated with the area that is within the third threshold distance from the retail shopping facility is within the index threshold value. In some embodiments, the method includes providing, by the control circuit, the optical key to the user interface device. In some embodiments, the method includes, in response to receiving the first signal from the smart lock, prompting, by the user interface device, the user to provide the authentication data. In some embodiments, the method includes receiving, by the user interface device, the authentication data from the user. In some embodiments, the method includes providing, by the user interface device, the authentication data to the control circuit to determine whether the user is the trusted user. In some embodiments, the method includes, in response to the determination by the control circuit that the user is the trusted user, receiving, by the user interface device, the optical key from the control circuit.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for user access to smart locks at a retail shopping facility, the system comprising:
    an access member that allows access to a secured space configured to store one or more items for sale at the retail shopping facility;
    a smart lock securing the access member; and
    a control circuit communicatively coupled to a user interface device operable by a user, the control circuit configured to:
        receive authentication data from the user interface device;
        determine whether the authentication data matches within a threshold of stored authentication data associated with a profile stored in a database, wherein the profile is associated with the user;
        determine that the user is a trusted user based on the determination that the authentication data matches with the stored authentication data within the threshold; and
        provide an optical key to the user interface device for the user interface device to provide the optical key to the smart lock; and
    wherein the smart lock is configured to unlock the access member in response to receiving the optical key from the user interface device.

2. The system of claim 1, wherein the authentication data comprises biometric data, password, and an authentication code.

3. The system of claim 1, wherein the smart lock comprises an optical lock and an electronic lock, wherein the optical lock comprises a transceiver that receives one or more wavelengths corresponding to at least one of a visible range and an infrared range of electromagnetic spectrum.

4. The system of claim 1, wherein the smart lock comprises a transceiver, a locking mechanism, and a smart lock control circuit.

5. The system of claim 1, wherein the optical key comprises one of a laser beam signal and an infrared signal transmitted by the user interface device.

6. The system of claim 1, wherein the control circuit is further configured to:
    determine whether a store-risk value associated with the retail shopping facility is within a risk threshold value; and
    further determine that the user is the trusted user based additionally on the determination that the store-risk value associated with the retail shopping facility is within the risk threshold value, wherein the store-risk value is based on historical shrinkage events associated with the retail shopping facility, and wherein shrinkage events comprise shoplifting and employee theft.

7. The system of claim 1, wherein the control circuit is further configured to:
   determine whether a crime index value associated with an area that is within a threshold distance from the retail shopping facility is within an index threshold value; and
   further determine that the user is the trusted user based additionally on the determination that the crime index value associated with the area that is within the threshold distance from the retail shopping facility is within the index threshold value, wherein the crime index value is based on crime data associated with the area that is within the threshold distance from the retail shopping facility.

8. The system of claim 1, wherein the access member comprises a door, a lid, a hinged barrier, a sliding harrier, a revolving barrier to at least one of: an entrance to a room and a storage container, and wherein the storage container comprises a glass display case, a shelf, a rack, and an enclosed container.

9. The system of claim 1, wherein inside the secured space comprises one or more sensors configured to provide sensor data corresponding to the one or more items stored inside the secured space, and wherein the control circuit is further configured to determine whether a first item of the one or more items is removed or returned inside the secured space.

10. The system of claim 1, further comprising one or more biometric sensors coupled to at least one of the smart, lock and the access member, the one or more biometric sensors configured to capture biometric data of the user to provide additional verification that the user is the trusted user.

11. The system of claim 1, wherein the smart lock is configured to:
   in response to a detection of the user interface device, initiate communication with the user interface device to determine whether the user is pre-authorized to access the secured space; and
   in response to a determination that the user is pre-authorized to access the secured space, provide a signal to the user interface device.

12. A method for user access to smart locks at a retail shopping facility, the method comprising:
   receiving, by a control circuit communicatively coupled to a user interface device operable by a user, authentication data from the user interface device;
   determining, by the control circuit, whether the authentication data matches within a threshold of stored authentication data associated with a profile stored in a database, wherein the profile is associated with the user;
   determining, by the control circuit, that the user is a trusted user based on the determination that the authentication data matches with the stored authentication data within the threshold;
   providing, by the control circuit, an optical key to the user interface device for the user interface device to provide the optical key to a smart lock; and
   unlocking, by the smart lock, an access member in response to receiving the optical key from the user interface device.

13. The method of claim 12, wherein the authentication data comprises biometric data, password, and an authentication code.

14. The method of claim 12, wherein the smart lock comprises optical lock and electronic lock.

15. The method of claim 12, wherein the smart lock comprises a transceiver, a locking mechanism, and a smart lock control circuit.

16. The method of claim 12, wherein the optical key comprises laser beam and infrared signal.

17. The method of claim 12, further comprising:
   determining, by the control circuit, whether a store-risk value associated with the retail shopping facility is within a risk threshold value; and
   further determining, by the control circuit, that the user is the trusted user based additionally on the determination that the store-risk value associated with the retail shopping facility is within the risk threshold value, wherein the store-risk value is based on historical shrinkage events associated with the retail shopping facility, and wherein shrinkage events comprise shoplifting and employee theft.

18. The method of claim 12, further comprising:
   determining, by the control circuit, whether a crime index value associated with an area that is within a threshold distance from the retail shopping facility is within an index threshold value; and
   further determining, by the control circuit, that the user is the trusted user based additionally on the determination that the crime index value associated with the area that is within the threshold distance from the retail shopping facility is within the index threshold value, wherein the crime index value is based on crime data associated with the area that is within the threshold distance from the retail shopping facility.

19. The method of claim 12, wherein the access member comprises a door, a lid, a hinged barrier, a sliding barrier, a revolving barrier to at least one of: an entrance to a room and a storage container, and wherein the storage container comprises a glass display case, a shelf, a rack, and an enclosed container.

20. The method of claim 12, further comprising determining, by the control circuit, whether a first item of one or more items stored inside a secured space is removed or returned inside the secured space based on sensor data provided by one or more sensors inside the secured space.

21. The method of claim 12, further comprising capturing, by one or more biometric sensors coupled to at least one of the smart lock and the access member, biometric data of the user to provide additional verification that, the user is the trusted user.

* * * * *

UNITED STATES PATENT AND TRADEMARK OFFICE
CERTIFICATE OF CORRECTION

PATENT NO. : 11,810,414 B2  
APPLICATION NO. : 17/869442  
DATED : November 7, 2023  
INVENTOR(S) : Taylor et al.

Page 1 of 1

It is certified that error appears in the above-identified patent and that said Letters Patent is hereby corrected as shown below:

In the Claims

In Column 31, Claim 8, Line 19, delete "sliding harrier," and insert -- sliding barrier, --, therefor.

In Column 31, Claim 10, Line 32, delete "smart, lock" and insert -- smart lock --, therefor.

In Column 32, Claim 21, Line 55, delete "that, the" and insert -- that the --, therefor.

Signed and Sealed this  
Twenty-second Day of July, 2025

Coke Morgan Stewart  
*Acting Director of the United States Patent and Trademark Office*